US006056150A

United States Patent [19]

Kasper

[11] Patent Number: 6,056,150

[45] Date of Patent: May 2, 2000

[54] APPARATUS FOR DISPENSING TICKETS, CARDS AND THE LIKE FROM A STACK

[75] Inventor: Kazmier J. Kasper, Hopkinton, Mass.

[73] Assignee: Algonquin Industries, Inc., Bellingham, Mass.

[21] Appl. No.: 08/839,061

[22] Filed: Apr. 23, 1997

Related U.S. Application Data

[63] Continuation-in-part of application No. 08/526,501, Sep. 11, 1995, Pat. No. 5,647,507, which is a continuation-in-part of application No. 08/588,677, Nov. 16, 1995, Pat. No. 5,753,897, and a continuation-in-part of application No. 08/596,967, Feb. 5, 1996, Pat. No. 5,829,631.

[51] Int. Cl.$^7$ .............................. B65G 59/00; G07F 11/00

[52] U.S. Cl. .............................. 221/21; 221/98; 221/154; 221/191; 221/99; 209/657

[58] Field of Search .............................. 221/97, 98, 102, 221/154, 151, 197, 282, 191, 21, 99; 209/656, 657

[56] References Cited

U.S. PATENT DOCUMENTS

| | | | |
|---|---|---|---|
| 2,950,005 | 8/1960 | McDonald | 209/657 |
| 3,022,891 | 2/1962 | Efram et al. | 209/657 |
| 3,040,887 | 6/1962 | Cornelison | 209/657 |
| 4,340,150 | 7/1982 | Guibord et al. | 221/21 |
| 4,350,264 | 9/1982 | Muller | 221/197 |
| 4,570,801 | 2/1986 | Brannen | 221/21 |
| 5,062,598 | 11/1991 | Winkler | 221/21 |
| 5,301,834 | 4/1994 | Lee et al. | 221/197 |
| 5,611,456 | 3/1997 | Kasper | 221/154 |
| 5,647,507 | 7/1997 | Kaspet | 221/197 |
| 5,678,727 | 10/1997 | Rice | 221/98 |
| 5,743,430 | 4/1998 | Freixas | 221/97 |
| 5,775,145 | 7/1998 | Kasper | 70/367 |
| 5,829,631 | 11/1998 | Kaspet | 221/198 |

*Primary Examiner*—H. Grant Skaggs
*Attorney, Agent, or Firm*—Kriegsman & Kriegsman

[57] ABSTRACT

An apparatus for dispensing articles such as tickets and cards includes a cabinet. A plurality of article dispensing assemblies are disposed inside the cabinet. Each article dispensing assembly includes a base and a frame for enclosing the articles to be dispensed in a stack. The bases are mounted on a pair of vertical support plates. A gate is disposed behind each frame for receiving articles from its associated frame and allowing only one article at a time to pass through. A toothed blade is disposed underneath each frame and a motor driven rack and pinion is coupled to the toothed blade for bringing the toothed blade into engagement with the lowermost article in the stack, moving said toothed blade so that the lowermost article is transported from the stack into the gate, bringing the toothed blade out of engagement with the article and then moving the toothed blade back to engage the next article in the stack. The apparatus also includes an angled tray and a reject box, the reject box being underneath the angled tray. In the operation of the apparatus, articles dispensed by the article dispensing assemblies drop down into the top portion of the angled tray and then slide down to the bottom of the angled tray where they can be removed by a person. The intermediate portion of the angled tray includes a trap door. When an article to be dispensed is defective, the trap door opens causing the article to drop down into the reject box instead of sliding down to the bottom of the tray.

14 Claims, 23 Drawing Sheets

APPARATUS FOR DISPENSING TICKETS, CARDS AND THE LIKE FROM A STACK

CROSS-REFERENCE TO RELATED APPLICATIONS

This application is a continuation-in-part of Ser. No. 08/526,501 filed Sep. 11, 1995 and now U.S. Pat. No. 5,647,507 which, in turn, is a continuation-in-part of Ser. No. 08/588,677 filed Nov. 16, 1995 and now U.S. Pat. No. 5,753,897 and also is a continuation-in-part of Ser. No. 08/596,967 filed on Feb. 5, 1996 and now of U.S. Pat. No. 5,829,631, all of which are incorporated herein by reference.

BACKGROUND OF THE INVENTION

The present invention relates generally to an apparatus for dispensing articles and more particularly to an apparatus for dispensing articles such as tickets, cards and the like from a stack. The invention may be used for dispensing pull-tab type lottery tickets; however, it is to be understood that the invention is not exclusively limited to dispensing pull-tab type lottery tickets, but rather may be used for dispensing other types of tickets as well as other types of articles such as cards, including debit cards and telephone cards and the like from a stack.

In U.S. Pat. No. 3,790,161 to K. E. Ericsson there is disclosed an apparatus for feeding sheets, cards, banknotes and the like from a stack, the apparatus comprising a rotary roll which engages the lowermost sheet, card or banknote in the stack, a further roll spaced from and preferably slightly above the first roll, and a strip having a rough coating and so arranged between the two rolls as to extend inside a plane tangent to the peripheries of the rolls.

In U.S. Pat. No. 5,018,614 to W. D. K. Ruckert there is disclosed a ticket vending machine wherein an outer housing encloses an inner panel separating a money accepting and ticket dispensing apparatus. The money accepting apparatus releases an internal lever upon insertion of the correct money. This internal lever disengages from a toothed plate which is connected by a shaft to an external hand lever. A pulling of the external hand lever after insertion of the correct money turns multiple gears which cause a cam to actuate to release a ticket retaining gate. In addition, the gears are connected to a cylindrical rear roller which turns a pair of latex bands mounted around the rear roller and a front cylindrical roller mounted on an idler shaft. A weight over the tickets causes frictional pressure to be exerted on the ticket by turning bands and thereby allows the bands to move a single ticket under a raised exit gate.

In U.S. Pat. No. 4,704,518 to F. A. Brumm et al there is disclosed an apparatus for printing and issuing tickets which has a circular ticket guide in which a drive cylinder is disposed to selectively rotate in a forward or reverse direction. A ticket magazine feeds a blank ticket into the ticket guide in the forward direction and the cylinder rotates, driving the ticket in the forward or reverse direction in order to execute a series of process steps involved in issuing the written ticket. The tickets are stacked in the magazine obliquely on edge and retained in a pack configuration at the lower end of the magazine by a gravity actuated ticket retainer. Arrayed in an arcuate sequence adjacent the ticket guide in the forward direction are a printing and reading apparatus, a ramped impound aperture, and a ramped issue aperture. A ticket is fed from the hopper in the forward direction and the drive cylinder is rotated to carry the ticket past the printing and reading apparatus where information is written and verified on the ticket. The drive cylinder continues to rotate in the forward direction, carrying the ticket pass the impound, and then the issue aperture. The drive cylinder then reverses, first offering the ticket through the issue aperture and then, if the ticket is not manually removed from the aperture, the drive cylinder is rotated to feed the ticket into an impound enclosure through the impound aperture.

In U.S. Pat. No. 4,716,799 to D. Hartmann there is disclosed an automatic ticket dispensing machine and a method for operating it to automatically adjust itself to the size of tickets being dispensed. A strip of tickets is fed forward with an advancing mechanism past an optical sensor which detects the perforations between tickets. The optical sensor is coupled to a controller which controls the advancing mechanism. The controller determines the length of the ticket by monitoring the distance the tickets are advanced between detections of perforations. In response to a request for a ticket, the controller advances the ticket strip by a distance corresponding to the predetermined ticket length of output.

In U.S. Pat. No. 4,982,337 to Burr et al there is disclosed a system and method for distributing lottery tickets which includes a large number of remote, ticket-dispensing units which are connected intermittently, e.g., once each day or week to a central computer. The units record the number of tickets sold and transmit the sales data to the central computer, which in turn performs all the necessary accounting functions. Sales reports and invoice data may be sent by, the central computer to each unit for printing, which avoids the need to mail the reports/invoices. The tickets are stored in fan-fold form and are burst, rather than cut, apart for dispensing. The tickets are dispensed at one end of the unit which faces the customer. A control panel for the vendor is located at the opposite end. Tickets of different length may be dispensed with an imprint of the vendor's name.

In U.S. Pat. No. 5,335,822 to K. J. Kasper, which patent is incorporated herein by reference, there is disclosed an apparatus for dispensing tickets from a stack. The apparatus includes a base. A frame for enclosing a stack of tickets is fixedly mounted on the base. A partition wall whose position can be changed to accommodate tickets of different sizes is removably mounted in the frame. A gate for receiving tickets and allowing only one ticket at a time to pass through is also fixedly mounted on the base. The gate includes a slider element which is adjusted to different heights by a screw having two different sized threads in order to accommodate tickets of different thickness. A toothed blade is disposed underneath the frame and a mechanism which includes a motor driven rack and pinion is coupled to the toothed blade for bringing the toothed blade into engagement with the lowermost ticket in the stack, moving said toothed blade so that the lowermost ticket is transported from the stack into the gate, bringing the toothed blade out of engagement with the ticket and then moving the toothed blade back to engage the next ticket in the stack. A removable weight is seated on top of the stack to push the stack down against the toothed blade. A ticket holder is provided to assist in loading tickets into the frame.

In U.S. Pat. No. 3,887,106 to P. M. Charlson etc. there is disclosed a cartridge for merchandise tickets or the like having a slot in its bottom at a ticket entrance end of the cartridge into which the tickets may be fed individually and having a slot in an opposite ticket discharge end and adjacent the bottom through which individual tickets may be fed out of the cartridge. The cartridge may be placed into a hopper having a feed roll movable upwardly so as to frictionally engage the lower most ticket in the cartridge for feeding the ticket out of the cartridge; and the cartridge may be placed into a stacker having feed rolls for moving a ticket through the slot in the bottom of the cartridge, with a feed roll being frictionally engageable with the ticket for moving it completely into the cartridge. A single switch is closed by the cartridge in the stacker so as to condition an associated machine for operation, and this switch is also actuated by a block on the top of a stack of tickets in the cartridge so as to open the switch when the cartridge is full for disabling the machine.

In U.S. Pat. No. 5,611,456 to K. J. Kasper, which patent is incorporated herein by reference, there is disclosed an apparatus for dispensing tickets, cards and the like.

Other patents of interest include U.S. Pat. No. 2,078,984 to S. W. Williamson; U.S. Pat. No. 2,637,609 to P. Berg; and U.S. Pat. No. 5,176,237 to R. G. Yang.

It is an object of this invention to provide a new and improved apparatus for dispensing tickets, cards and the like.

SUMMARY OF THE INVENTION

An apparatus constructed according to this invention for dispensing articles such as tickets, cards and the like from a stack comprises a cabinet and an article dispensing module inside said cabinet, said article dispensing module comprising an article dispensing assembly, said article dispensing assembly including a base, a frame for enclosing a plurality of articles in a stack, one on top of the other, a gate behind the frame for receiving articles from the stack and allowing only one article at a time to pass through and a transport mechanism for transporting articles from said frame to said gate. The article dispensing module also includes a pair of vertical support plates for supporting the base.

According to one embodiment of the invention, the frame is removably mounted on the base, the frame including an open top through which articles to be dispensed are loaded, a rear wall underneath which articles from the stack exit the frame, a cover for covering the top and extending over the rear wall, a gate for controlling exiting of articles from underneath the rear wall of the frame and a first locking mechanism for locking the cover in place over the top and the article dispensing assembly further includes a second locking mechanism for locking the frame in place on the base, the second locking mechanism also controlling the operation of the gate on the frame.

According to one embodiment of the invention, wherein the articles to be dispensed are cards having an integrated circuit chip in which information may be read off of and/or written into, the apparatus further includes a read/write head assembly, the read/write head assembly being used to read information off of the chip on the card while it is in the frame and/or and write information onto the chip on the card while it is in the frame.

According to one feature of the invention, a reject box for collecting defective articles is removably mounted inside the cabinet and an angled tray for receiving articles dispensed from the article dispensing module is mounted inside the cabinet above the reject box. The angled tray includes a pivotally mounted trap door controlled by a computer inside the cabinet which when opened causes articles that are deemed defective to drop down into the reject box as they slide down toward the bottom of the angled tray for removal by a person (i.e. the purchaser of the article).

Various other features and advantages will appear from the description to follow. In the description, reference is made to the accompanying drawings which form a part thereof, and in which is shown by way of illustration, specific embodiments for practicing the invention. These embodiments will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

In the drawings wherein like reference numerals represent like parts.

DETAILED DESCRIPTION OF THE PREFERRED EMBODIMENTS

Figure 1:
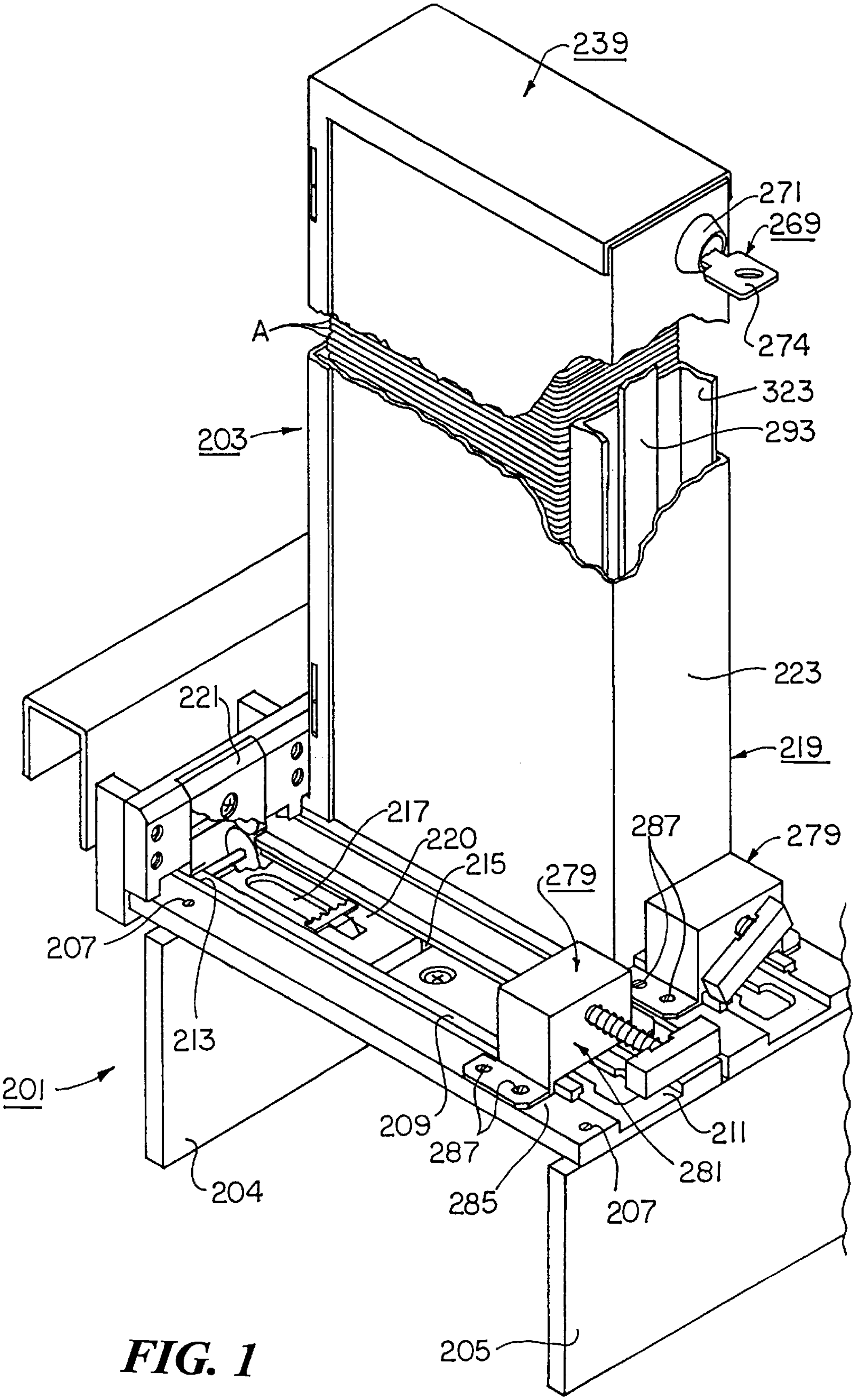
FIG. 1 is a perspective view partly broken away of an article dispensing module according to this invention for dispensing articles.
Figure 2:
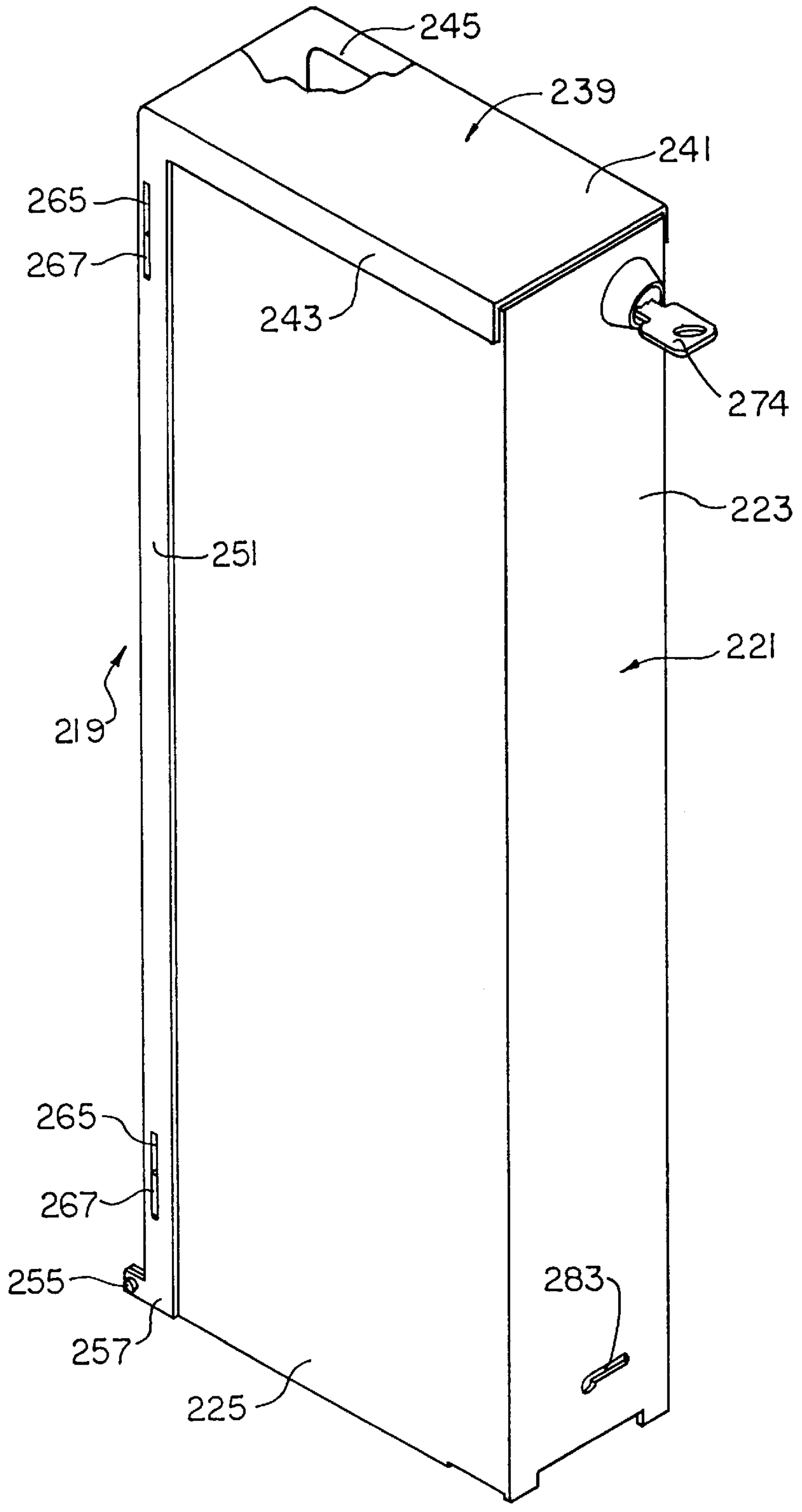
FIG. 2 is a perspective view of the frame shown in FIG. 1.
Figure 14:
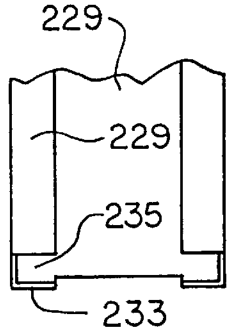
FIG. 14 is a fragmentary back end view of the main panel of the frame shown in FIG. 1.

Referring now to FIG. 1, there is shown a fragmentary view partly broken away of an article dispensing module according to this invention, the article dispensing module being identified by reference numeral 201. Portions of article dispensing module 201 not pertinent to the invention are not shown.

Article dispensing module 201 includes a plurality of article dispensing assemblies 203 which are identical in construction, only one and a portion of another one being shown for illustrative purposes. Article dispensing assemblies 203 are mounted on a pair of vertical support plates 204 and 205 and secured thereto by bolts 207.

Each article dispensing assembly 203 includes a generally rectangular base 209 having a front end 211, a rear end 213 and a longitudinally disposed rectangular recess 215 having a longitudinal opening 217 and a pair of rails 218-1 and 218-2, one on each side of recess 215.

Each article dispensing assembly 203 also includes an elongated frame 219 for enclosing a plurality of articles A to be dispensed in a stack S, one on top of the other. Articles A may be, for example, pull-tab type lottery tickets or plastic telephone cards, debit cards or the like. For illustrative purposes, only one frame 219 is shown in FIG. 1. Frame 219 is removably mounted on base 209.

Each article dispensing assembly 203 further includes a transport mechanism 220 identical to transport mechanism 69 and a gate 221 identical to gate 71. Transport mechanism 220 is located below frame 219 and gate 221 is located behind frame 219. The purpose of transport mechanism 220 is to transport articles A from stack S into gate 221. The purpose of gate 221 is to receive articles A transported to it from frame 219 and allow only one article at a time to pass through.

Frame 219, which is also shown in FIGS. 2 through 12, is generally rectangular in cross section, and includes a generally rectangularly shaped main panel 221 shaped to define a front wall 223, a pair of side walls 225 and 227, a rear wall 229 having an opening 230 at the middle, an open top 231 through which articles A can be loaded into frame 219 and a bottom wall 233 having an opening 237 at the middle so that the bottom article in the stack can be moved by the transport mechanism 220 which extends forward from rear wall 229 but not all the way to front wall 223. As can be seen, rear wall 229 does not extend all the way down to bottom wall 233 but rather stops just before bottom wall 233 so as to leave a space 235 through which articles can exit frame 219.

Frame 219 also includes a cover 239 for covering open top 231 and opening 23 in frame 219. Cover 239 includes a top portion 241 which includes a rectangular panel portion 243 having side flanges 245 and 247 and a side portion 249 which includes a rectangular panel portion 250 having side flanges 251 and 253, top portion 241 and side portion 249 defining an L shaped cover. Cover 239 is pivotally mounted on sheet 221 by pivot pins 255 which extend through end flanges 257 at the bottom of side flanges 251 and 253 and through end flanges 259 at the bottom of side walls 225. As can also can be seen, the bottom edge 261 of side panel 249 is spaced up from the bottom edges 262-1 and 262-2 of side flanges 245 and 247 so that articles A may be moved out of frame 219 from underneath bottom edge 261.

Figure 9:
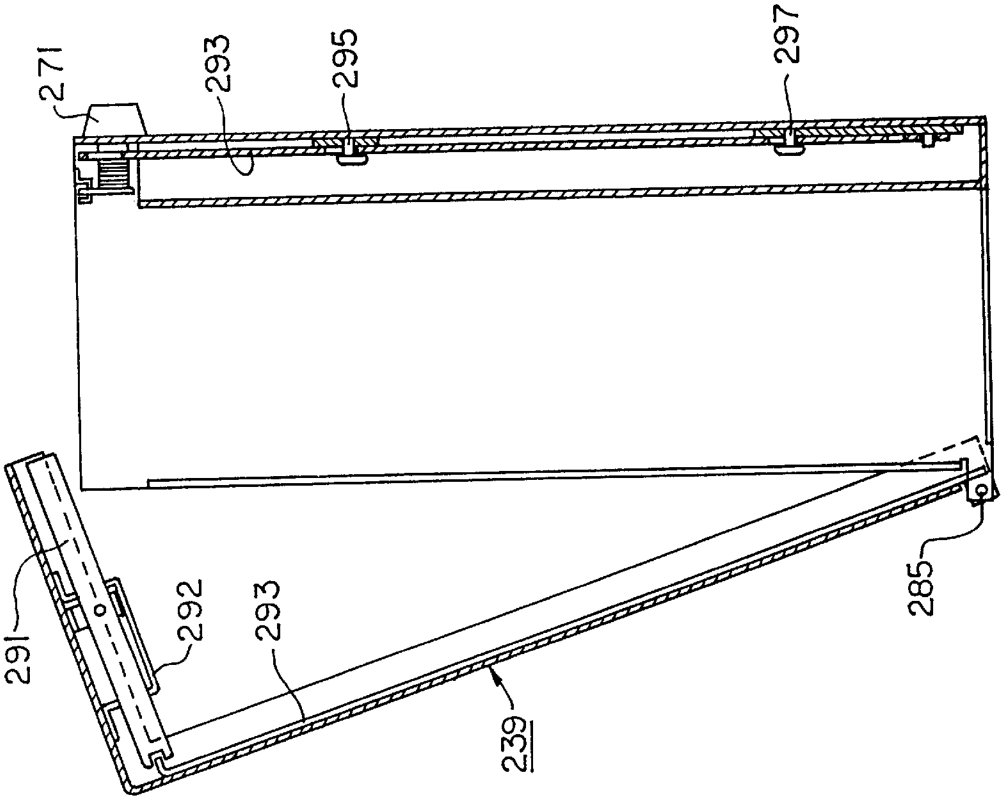
FIG. 9 is a side section view of the frame shown in FIG. 7 with the cover pivoted forward.
Figure 12:
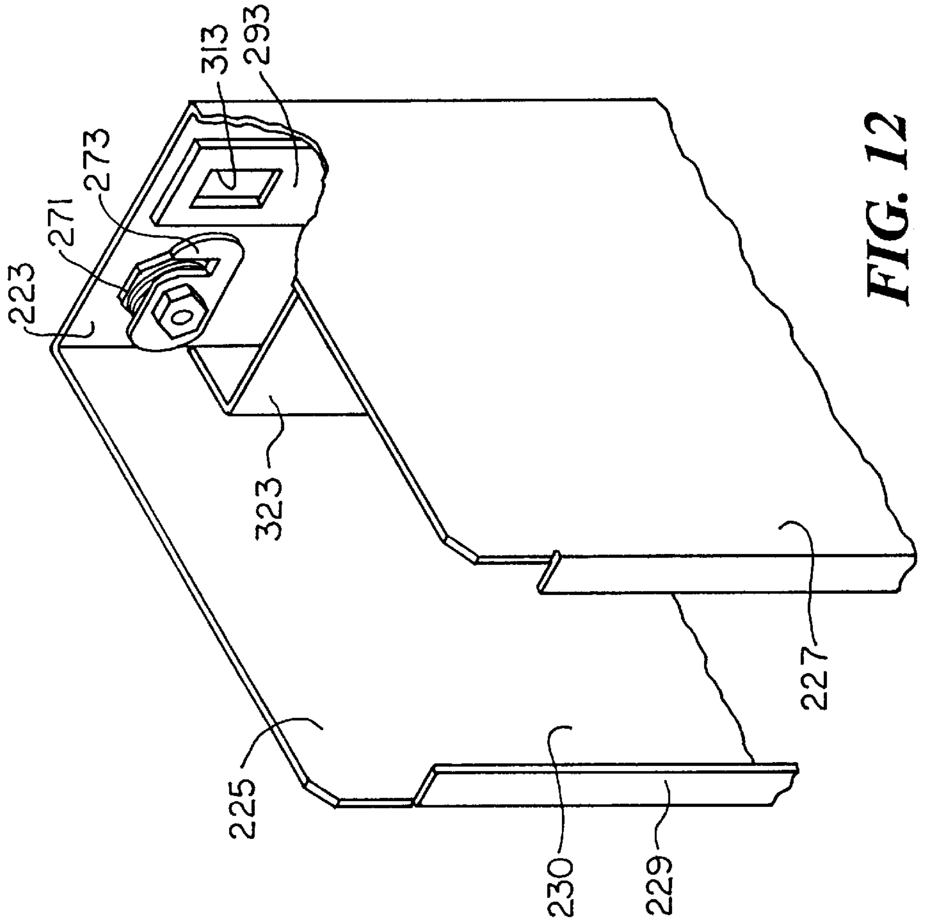
FIG. 12 is a fragmentary perspective view of the top inside portion of the cover in the frame in FIG. 2.
Figure 11:
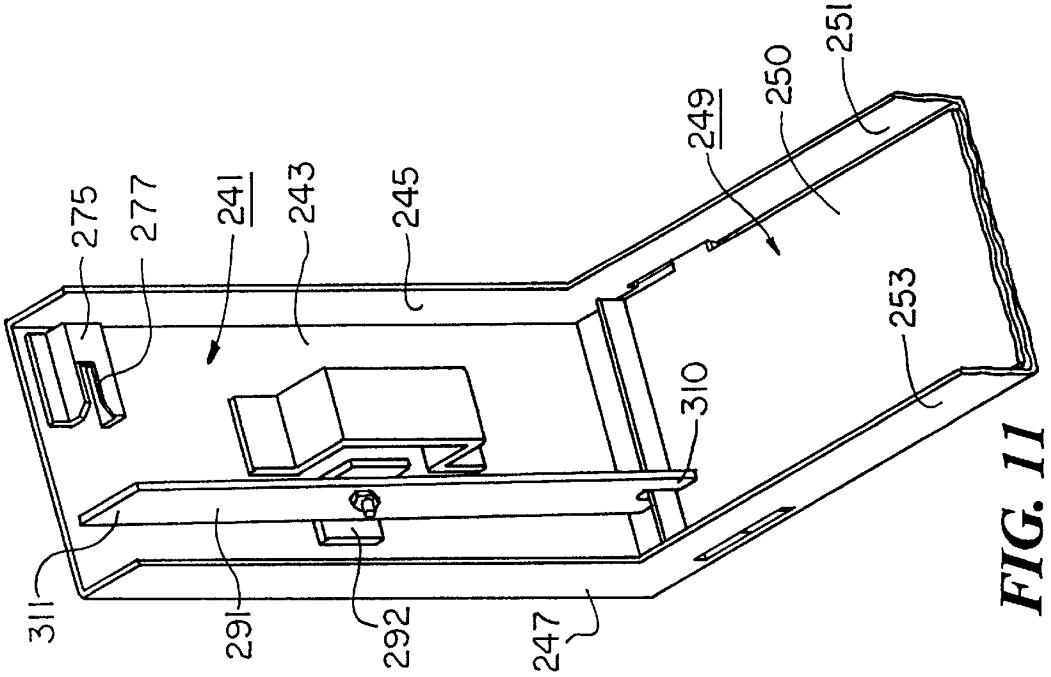
FIG. 11 is a fragmentary perspective view of the top inside portion of the cover in the frame in FIG. 2.
Figure 13:
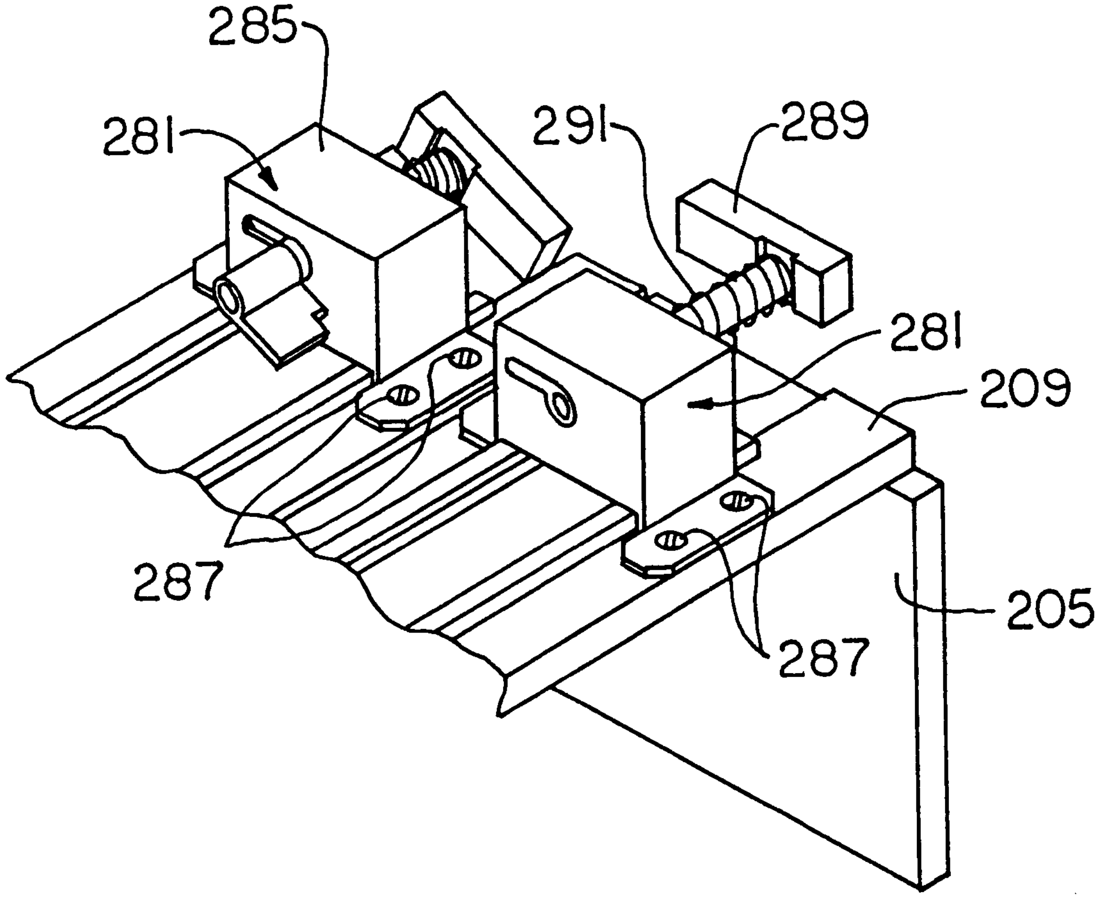
FIG. 13 is a fragmentary perspective view from the front of the frame locking key assemblies shown in FIG. 1.

When cover 239 is in an open position as shown in FIG. 9 articles A may be loaded into frame 219 from the top as shown by arrows A. On the other hand, when cover 239 is in a closed position, as shown for example in FIG. 2, the opening at the at the top of frame 219 is completely covered and articles A cannot be removed through that opening. As can also be seen, when cover 239 is in a closed position opening 230 is completely covered.

Figure 4:
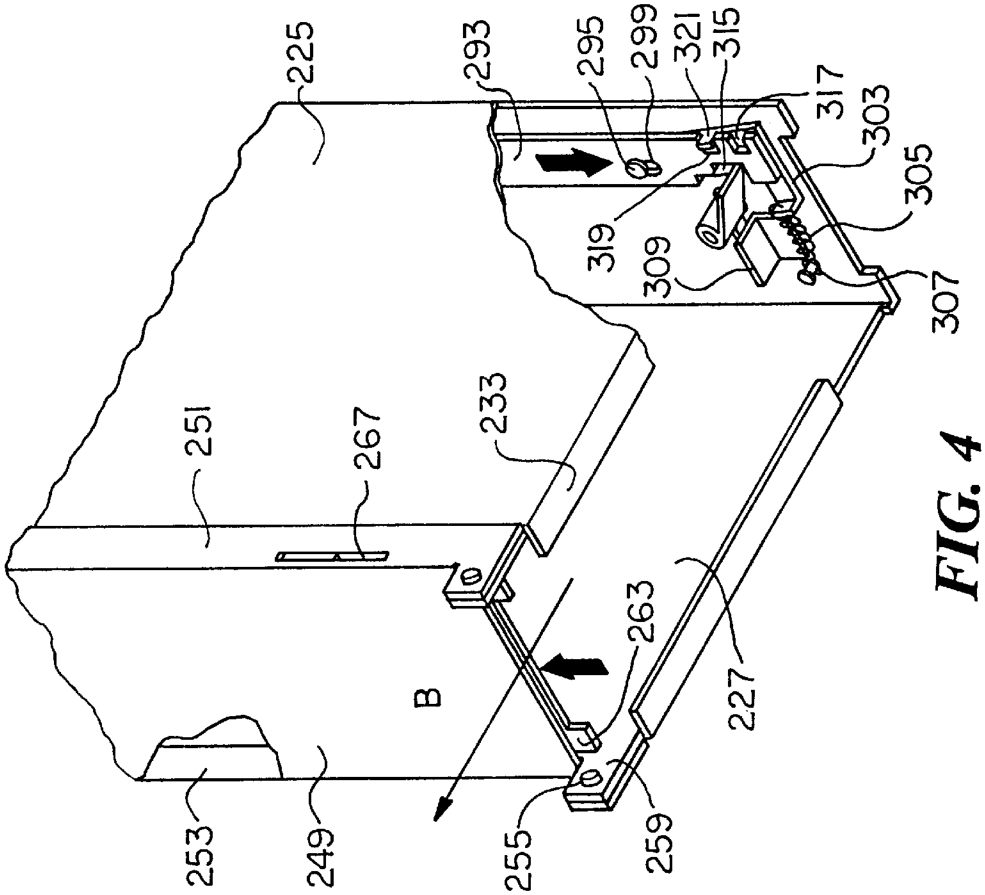
FIG. 4 is a fragmentary perspective view taken from the bottom and partly broken away of the frame as shown in FIG. 3 but with the gate in the frame in a raised position.
Figure 3:
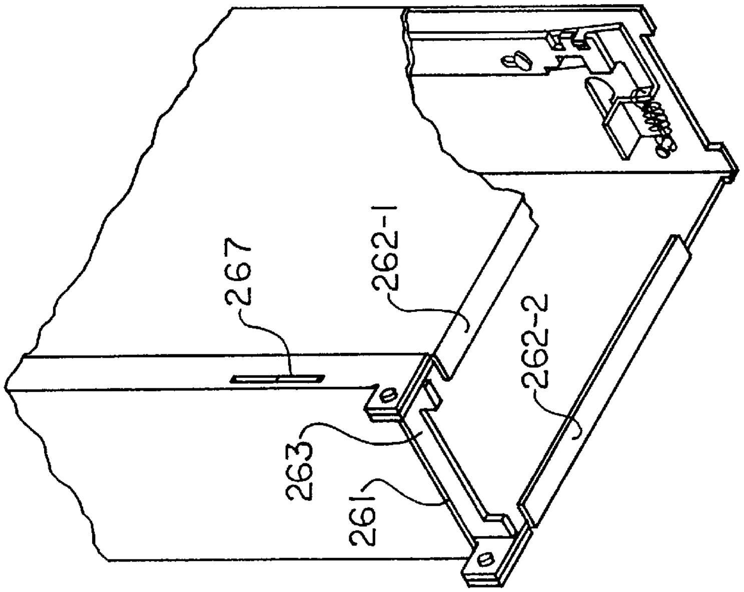
FIG. 3 is a fragmentary perspective view taken from the bottom and partly broken away of the frame shown in FIG. 2 with the gate in the frame in a lowered position and the spacer plate inside the frame removed.
Figure 5:
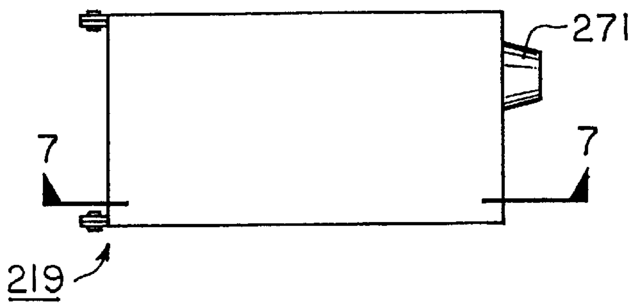
FIG. 5 is a top view of the frame shown in FIG. 2.
Figure 6:
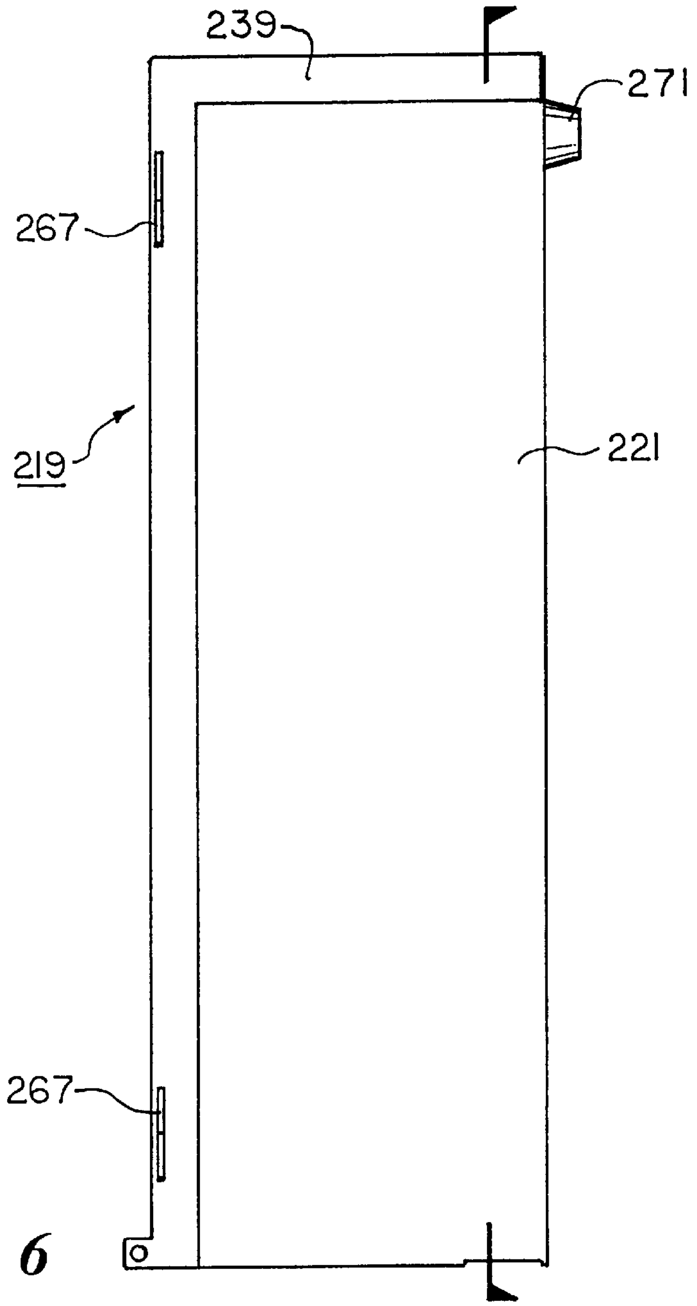
FIG. 6 is a side view of the frame shown in FIG. 2.
Figure 8:
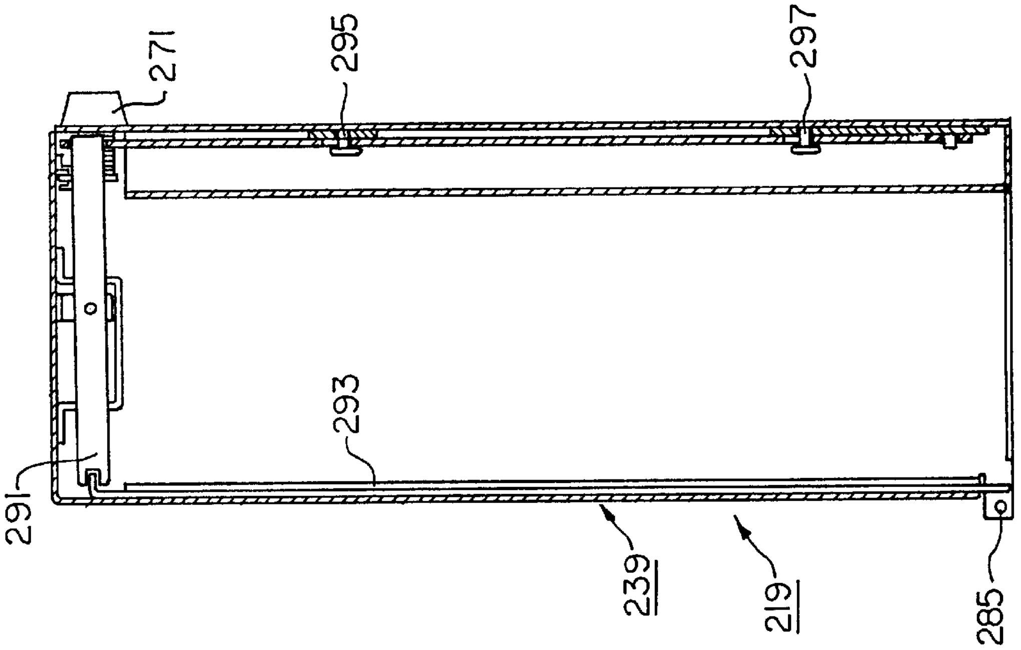
FIG. 8 is a section view similar to that shown in FIG. 7 but with the gate in a raised position.
Figure 7:
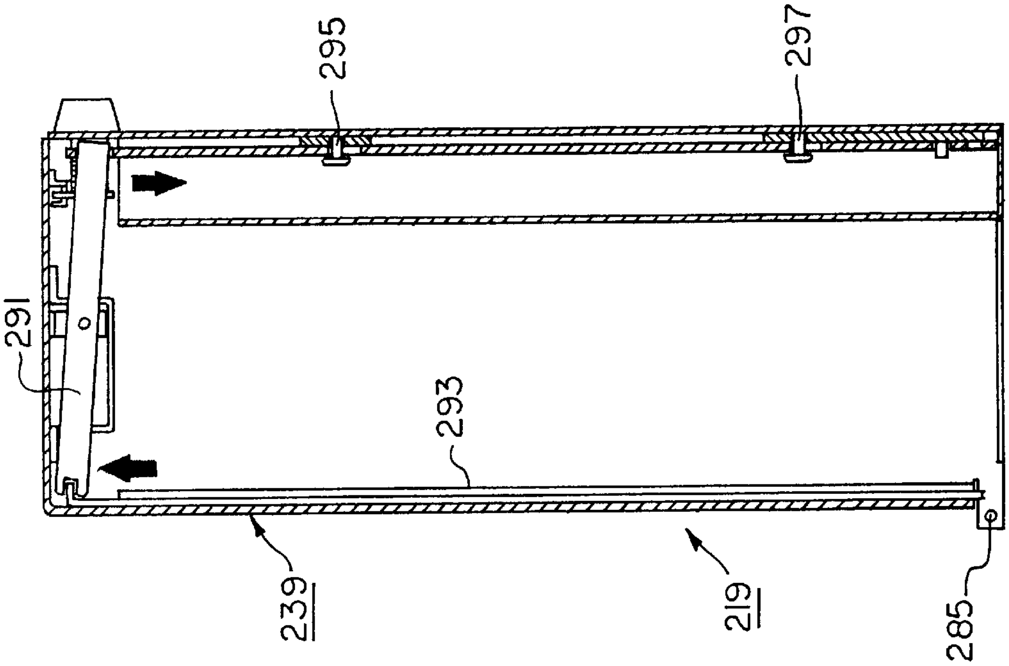
FIG. 7 is a section view taken along lines 7—7 in FIG. 5 with a gate in a lowered position.
Figure 15:
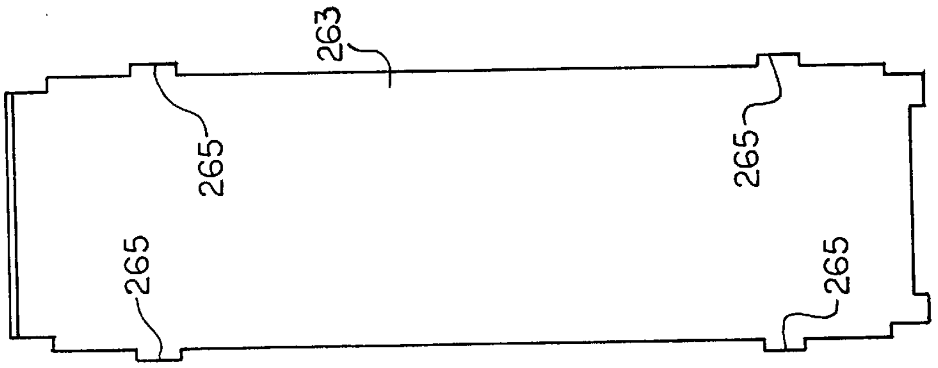
FIG. 15 is a plan view of the gate inside the frame shown in FIG. 3.
Figure 10:
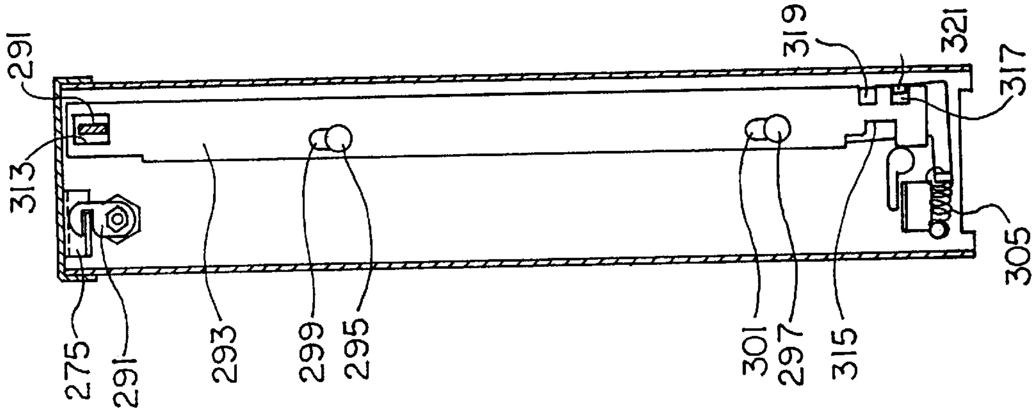
FIG. 10 is a back section view of the frame shown in FIG. 9.

Frame 219 further includes a gate 263 which is slidably mounted for up and down movement inside frame 219 on side portion 249 of cover 239 for controlling the exiting of articles A from within frame 219. The slidable mounting of gate 263 is achieved through side tabs 265 on gate 263 which ride in slots 267 formed on side portion 249. When gate 263 is in a lowered position as shown in FIG. 3 articles A inside frame 219 cannot exit frame 219 from underneath side portion 249 of cover 239. On the other hand, when gate 263 is in a raised position as shown in FIG. 4 articles A can exit from frame 219 underneath side portion 249 of cover 239 in the direction shown by arrow B.

Frame 219 also includes a first locking mechanism 269 for locking cover 239 in a closed position on frame 219. First locking mechanism 269 includes a lock 271 fixedly mounted on front wall 223 of frame 219 and having a movable arm 273, a removable key 274 for turning arm 273 and a bracket 275 on the inside of top portion 241 of cover 239, bracket 275 having an engagement slot 277 for engagement by arm 273. When cover 239 is closed and arm 273 is turned so that it is inside slot 277, cover 239 is locked shut on main panel 221. On the other hand, when arm 273 is not inside slot 277, cover 239 is not in a locked position. Bracket 275 is positioned on top portion 241 so that arm 273 can extend into slot 277 only when cover 239 is in a fully closed position on main panel 221.

Article dispensing assembly 203 further includes a second locking mechanism 279 for locking frame 219 in place on base 209. Locking mechanism 279 includes a key assembly 281 and a keyhole 283. Keyhole 283 is formed on front wall 223 of frame 219 near the bottom. Key assembly 281 includes a bracket 285 fixedly mounted on base 209 by bolts 287, a key 289 slidably mounted on bracket 285 and a spring 291 for urging key 289 forward (i.e. away from frame 219). When key 289 is inserted into keyhole 283 and turned, frame 219 will be locked in place on base 209.

Frame 219 also includes a lever arm 291 pivotally mounted on a bracket 292 fixed to top portion 241 of cover 239, a first coupling arm 293 slidably mounted on front wall 223 inside frame 219 on pins 295 and 297 which ride in slots 299 and 301 for up and down movement and a second coupling arm 303 pivotally connected at one end to pin 297 and connected at the other end to a spring 305 attached by a pin 307 to a blocking plate 309. One end 310 of lever arm 291 is pivotally mounted on gate 263.

When cover 239 is not in a fully closed position on main panel 221 of frame 219, gate 263 can be slidably moved up and down on rear wall 229. On the other hand, when cover 239 is fully closed on main panel 221, and either locked shut or unlocked, end 311 of lever arm 291 will extend through a rectangular opening 313 near the top of first coupling arm 293, thereby locking gate 263 in its lowered (down) position. Thus, when cover 239 is fully shut, closed articles A cannot exit from underneath bottom wall 233 and when cover 239 is locked, articles cannot be removed from the top of frame 219.

When frame 219 is mounted on base 209 and key 289 is inserted in keyhole 283 and turned, key 289 will, in addition to locking frame in place on base 209, engage a slot 315 near the bottom of first coupling arm 293 and move first coupling arm 293 to a down position. When arm 293 is moved to a down position, as it moves it will pivot lever arm 291 which in turn will raise gate 263.

Thus, key 289 performs two functions when inserted and turned; namely, (1) locks frame 219 in place on base 207 and (2) at the same time raises gate 263.

First coupling arm 293 has two notches 317 and 319 and second coupling arm 303 has a tab 321 when first coupling 303 is in an up position, tab 321 engages notch 317 and when first coupling arm 293 is in a down position, tab 321 will engage notch 317.

Frame 219 also includes a U-shaped spacer bracket 323 which is fixedly mounted inside frame 219.

Article dispensing module 201 further includes two sets of exit rollers 325 and 327, identical to rollers 151 and 152. Rollers 325 and 327 are mounted on shafts 329 and 331 which are coupled by a belt (not shown) to a drive motor (not shown).

Figure 16:
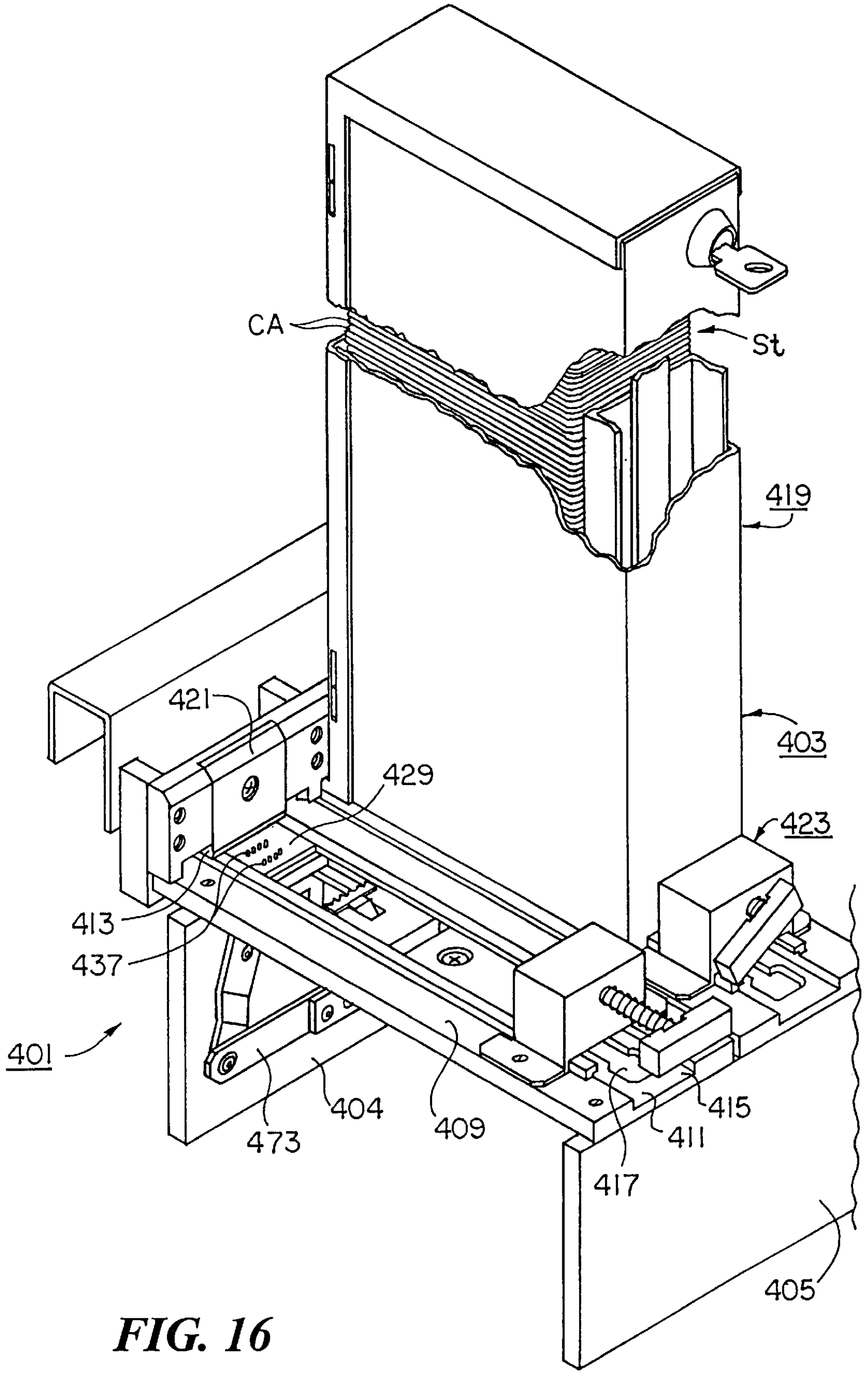
FIG. 16 is a perspective view from the front and partly broken away of another embodiment of an apparatus constructed according to this invention.

Referring now to FIG. 16, there is shown a fragmentary view partly broken away of another modification of article dispensing module 201 constructed according to this invention the modification of being identified by reference numeral 401. Portions of article dispensing module 401 not pertinent to the invention are not shown. Views of portions of module 401 are also shown in FIGS. 17 through 23.

Article dispensing module 401 is intended to be used in dispensing cards having an integrated circuit chip onto which information may be written into and/or read off.

Article dispensing module 401 includes four article dispensing assemblies 403 which are identical to article dispensing assemblies 203, only one assembly 403 and a portion of another assembly 403 being shown in FIG. 16 for illustrative purposes. Article dispensing assemblies 403 are mounted on a pair of vertical support plates 404 and 405, identical to vertical support plates 204 and 205 and secured thereto by bolts 407. Article dispensing module 401 also includes exit rollers mounted on shafts and coupled by a belt to a drive motor (all not shown) identical to the arrangement shown in FIG. 6.

Each article dispensing assembly 403 includes a generally rectangular base 409 similar to base 209 and having a front end 411, a rear end 413 a longitudinally disposed rectangular recess 415 having a longitudinal opening 417 and a pair of spaced apart rails 418-1 and 418-2.

Each article dispensing assembly 403 also includes an elongated frame 419, identical to frame 219, for enclosing a plurality of cards CA to be dispensed in a stack St, one on top of the other. Cards CA are of the type which include an integrated circuit chip into which information can be written into and read off of, the chips having a plurality of external input and output terminals, a CPU and a memory. Cards CA are disposed in frame 419 with their integrated circuit chips facing down so that they can be electrically contacted by the read/write assemblies described below. For illustrative purposes, only one frame 419 is shown in FIG. 16. Frame 419 is removably mounted on base 409 in the same manner as frame 219 and is removably mounted on base 209.

Each article dispensing assembly 403 further includes a locking mechanism 423 identical in structure and function to locking mechanism 279.

Each article dispensing assembly 403 further includes a transport mechanism 420 identical in structure and function to transport mechanism 220 and a gate 421 identical to gate 221. Transport mechanism 420 is located below frame 419 and gate 421 is located behind frame 419. The purpose of transport mechanism 420 is to transport cards CA from stack St into gate 421.

Each article dispensing assembly 403 further includes a read/write head assembly 425. The purpose of the read/write head assemblies 425 is to read information from the integrated circuit chip on the card CA at the bottom of the stack in its frame and/or write information onto the integrated circuit chip on the card CA at the bottom of the stack in its frame.

Each read/write head assembly 425 includes a read/write head 427 and a guide block 429.

Figure 17:
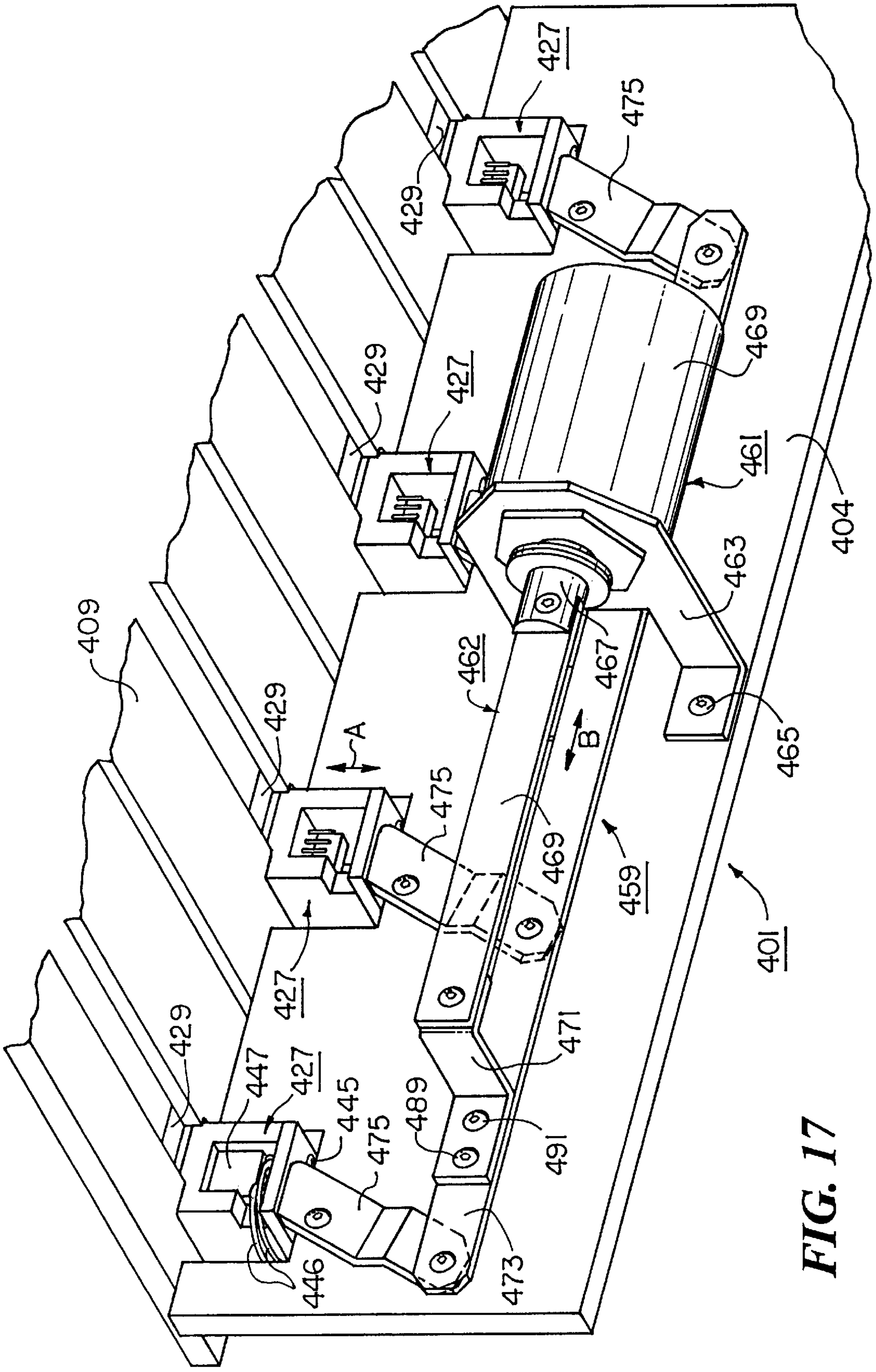
FIG. 17 is an enlarged fragmentary view taken from the bottom of the apparatus shown in FIG. 16.

Read/write head 427 is disposed for vertical up and down movement, as shown by arrows A in FIG. 17, in an opening 431 in base 409 and an opening 433 in support plate 404. Read/write head 427 is movable up and down so that it can be brought into and out of contact with the integrated circuit chip to be written into or read off of. Read/write head 427 includes a pin holding block 435, a plurality of electrical contact pins 437 and a plate 439. Pins 437 are press fit into vertical passageways formed in pin holding block 435 and project out from the top surface 441 of pin holding block 435. Plate 439 is attached to the bottom 443 of holding block 435 by bolts 445. Pins 437 are connected to computer C by wires 446 which are coupled to pins 437 through a connector 447. For illustrative purposes, only one set of wires and its associated connector are shown in the drawings.

Guide block 429 is seated on base 409 above read/write head 427. Pins 437 on block 435 project up into and are slidably movable in vertical channels 449 formed in guide block 429. A spring 451 seated in a recess 453 in pin holding block 435 pushes pin holding block 435 in a downward direction away from guide block 429. Spring 451 is kept in place by a threaded rod 453 which is screwed into guide block 429 and is slidably disposed in recess 453 and passageway 455 in pin holding block 435.

Figure 22:
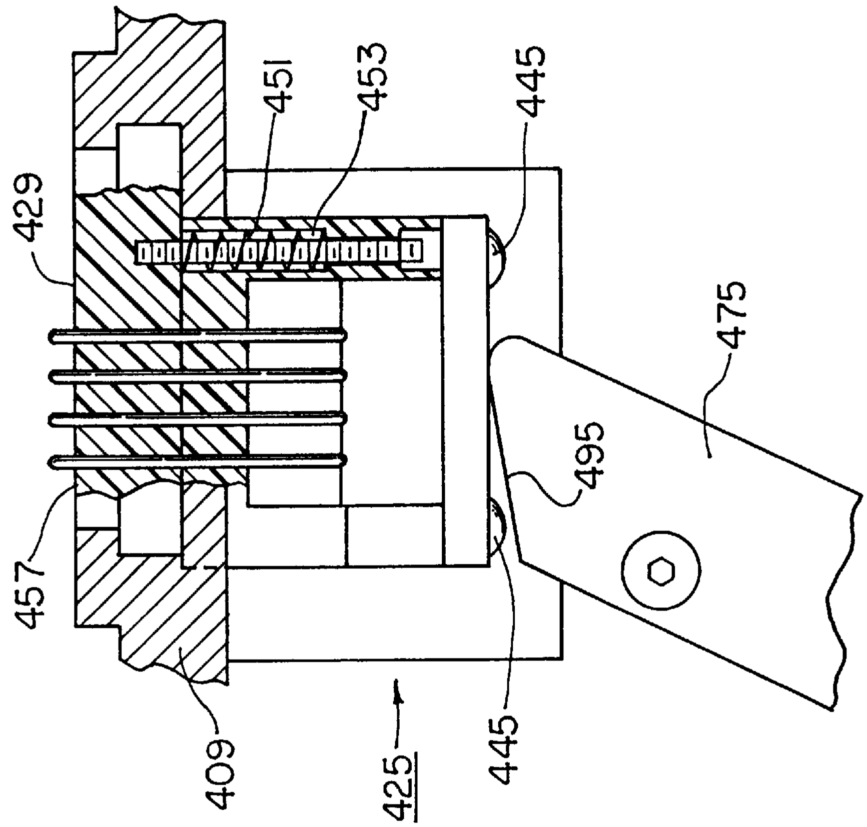
FIG. 22 is an enlarged view partly in section of one of the read/write head assemblies and its associated lever as shown in FIG. 17 with the read/right head in a raised position.
Figure 21:
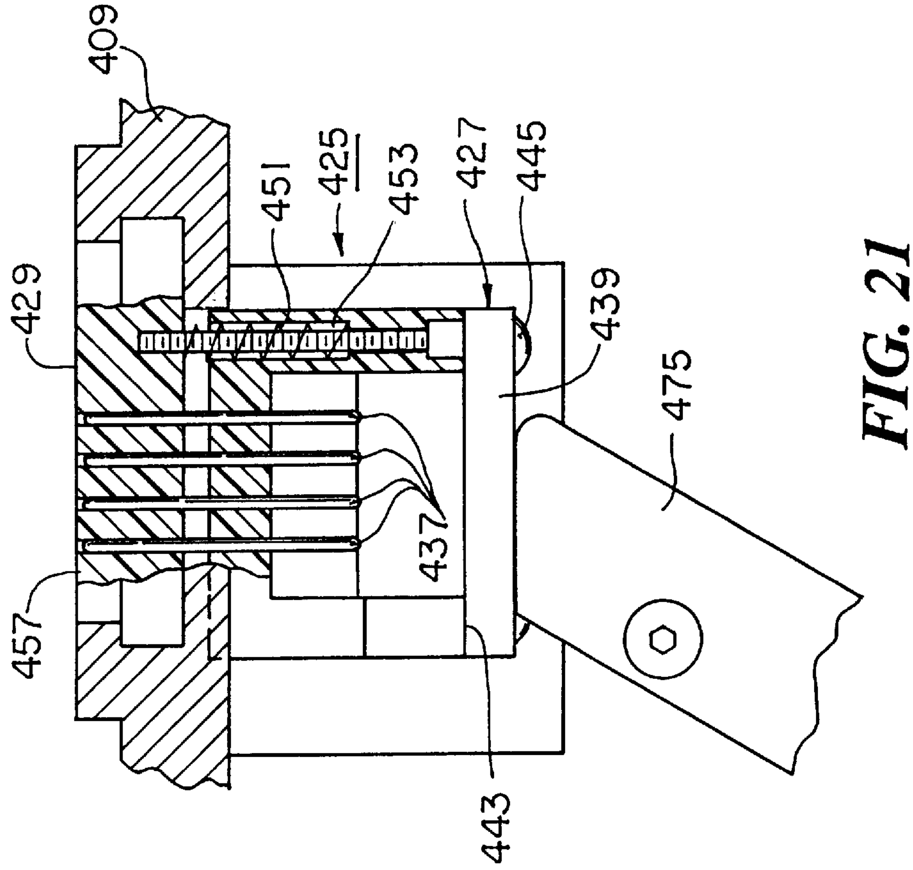
FIG. 21 is an enlarged view partly in section of one of the read/write head assemblies and its associated lever as shown in FIG. 17 with the read/write head in a lowered position.

When pin holding block 435 is in a down position, as shown in FIG. 21, pins 437 extend up into but not completely through channels 449. On the other hand, when pin holding block 435 is in a raised position, as shown in FIG. 22, pins 437 project up beyond the top surface 457 of guide block 429 so that they can contact the input/output terminals of the integrated circuit chip on the card CA to be read off of and/or written into.

Read/write head assembly 425 is positioned on base 409 such that pins 437 are aligned with the input/output terminals on the integrated circuit chip.

Article dispensing module 401 further includes a mechanism 459 for moving read/write head 427 up and down so that pins 437 can be brought into and out of contact with the integrated circuit chip on the card to be read off of or written into.

Mechanism 459 includes a solenoid 461 and a mechanical linkage assembly 462.

Figure 18:
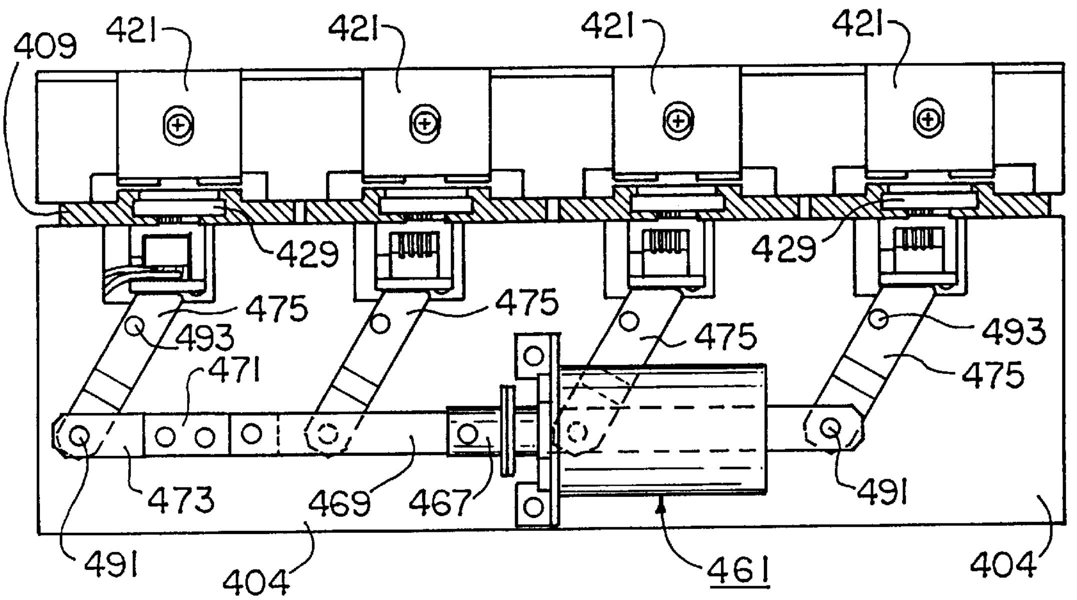
FIG. 18 is a front elevation view partly in section of the portion of the apparatus shown in FIG. 17 with the read/write heads in a lowered position.
Figure 19:
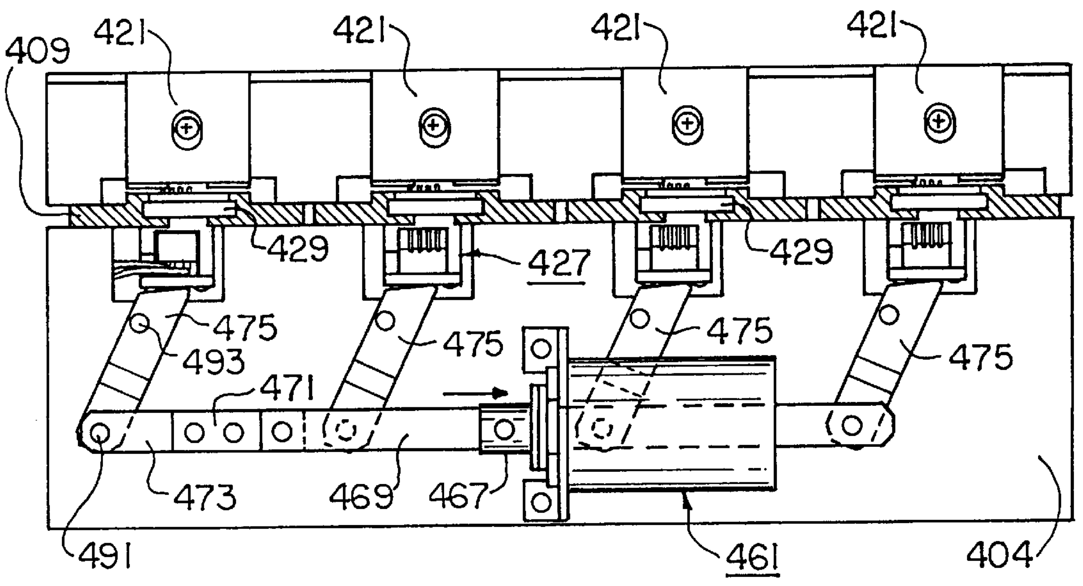
FIG. 19 is a front elevation view partly in section of the portion of the apparatus shown in FIG. 17 with the read/write heads in a raised position.
Figure 20:
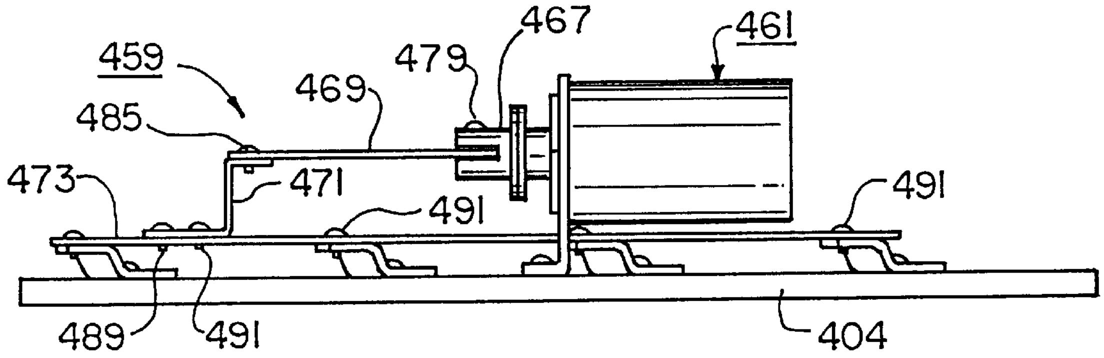
FIG. 20 is a top view of the solenoid and linkage shown in FIG. 17.
Figure 23:
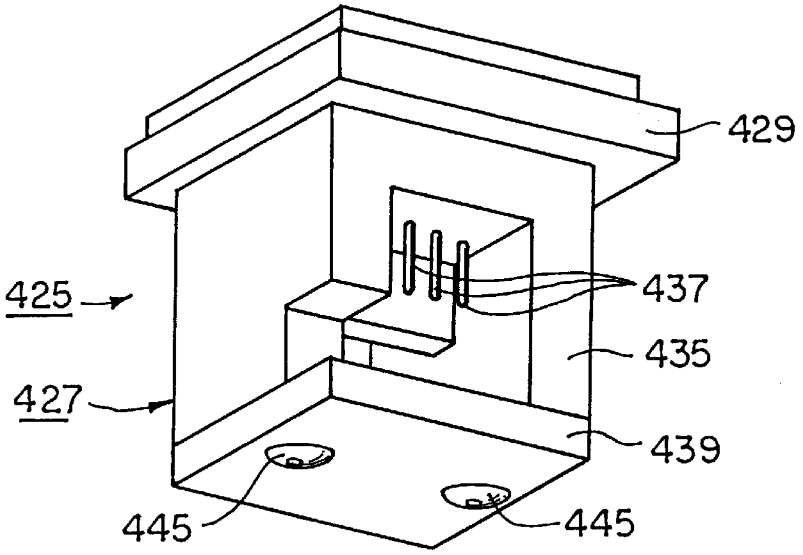
FIG. 23 is an enlarged perspective view of one of the read/write heads shown in FIG. 17.

Solenoid 461 is fixedly mounted on support plate 404 by a bracket 463 and bolt 465. Solenoid 461 is connected by wires (not shown) to computer C which controls its operation. Solenoid 461 includes a plunger 467 which is movable back and forth in housing 469 in the direction shown by arrows B in FIG. 17. When solenoid 461 is deenergized, plunger 467 is in an extended position as shown in FIG. 18. When solenoid is energized plunger 467 moves to a retracted position as shown in FIG. 19.

Mechanical linkage assembly 462 includes a first bar 469, a second bar 471, a third bar 473 and a plurality of levers 475, one lever 475 for each read/write head assembly 425.

First bar 469, is an elongated straight member, is fixedly mounted at one end 477 on plunger 467 by a bolt 479 and nut (not shown). The other end 481 of first bar 469 is fixedly by a bolt 485 and nut (not shown) on one end 483 of second bar 471, which is Z shaped. The other end 487 of second bar 471 is mounted onto third bar 473 by a pair of bolts 489 and 491 and nuts (not shown). Third bar 473 is an elongated straight member. Levers 475 are pivotally mounted at their bottom ends 489 onto third bar 473 by pivot pins 491, each lever 475 being positioned for interaction with one read/write head 427. Levers 475 are also pivotally mounted at a mid location onto support plate 404 by pivot pins 493. The top ends 495 of levers 475 are angled and in contact with plates 439.

As can be seen, when solenoid 461 is deenergized, the top end 495 of lever 475 is flush with bottom surface 497 of plate 439 as shown in FIGS. 18 and 21 and the read/write heads are in a lowered position. On the other had when solenoid 461 is energized, plunger 467 is moved inward in housing 469 causing levers 475 to pivotally move to a position as shown in FIGS. 19 and 22. This, in turn, moves read/write heads to a raised position, as is also shown in FIGS. 19 and 22.

In operation of module 401, read/write head 427 is moved up when information is to be written onto or read off of a card and moved down when the information has been read off of or written into the cars so that the card can be moved without being damaged or scratched by the pins.

Figure 24:
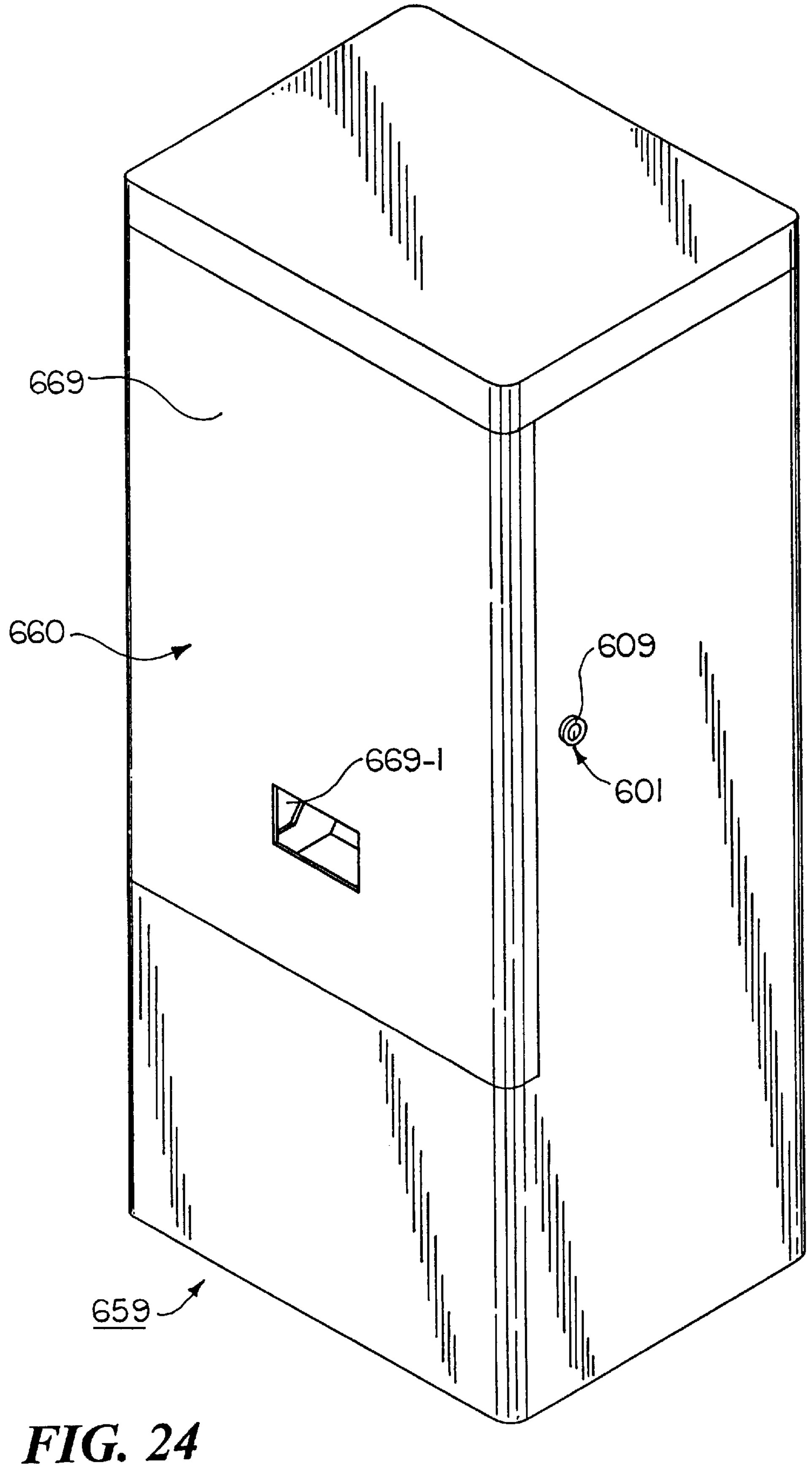
FIG. 24 is a perspective view of an apparatus constructed according to the teachings of the present invention, the apparatus including a cabinet, the door of the cabinet being in the closed position.
Figure 25:
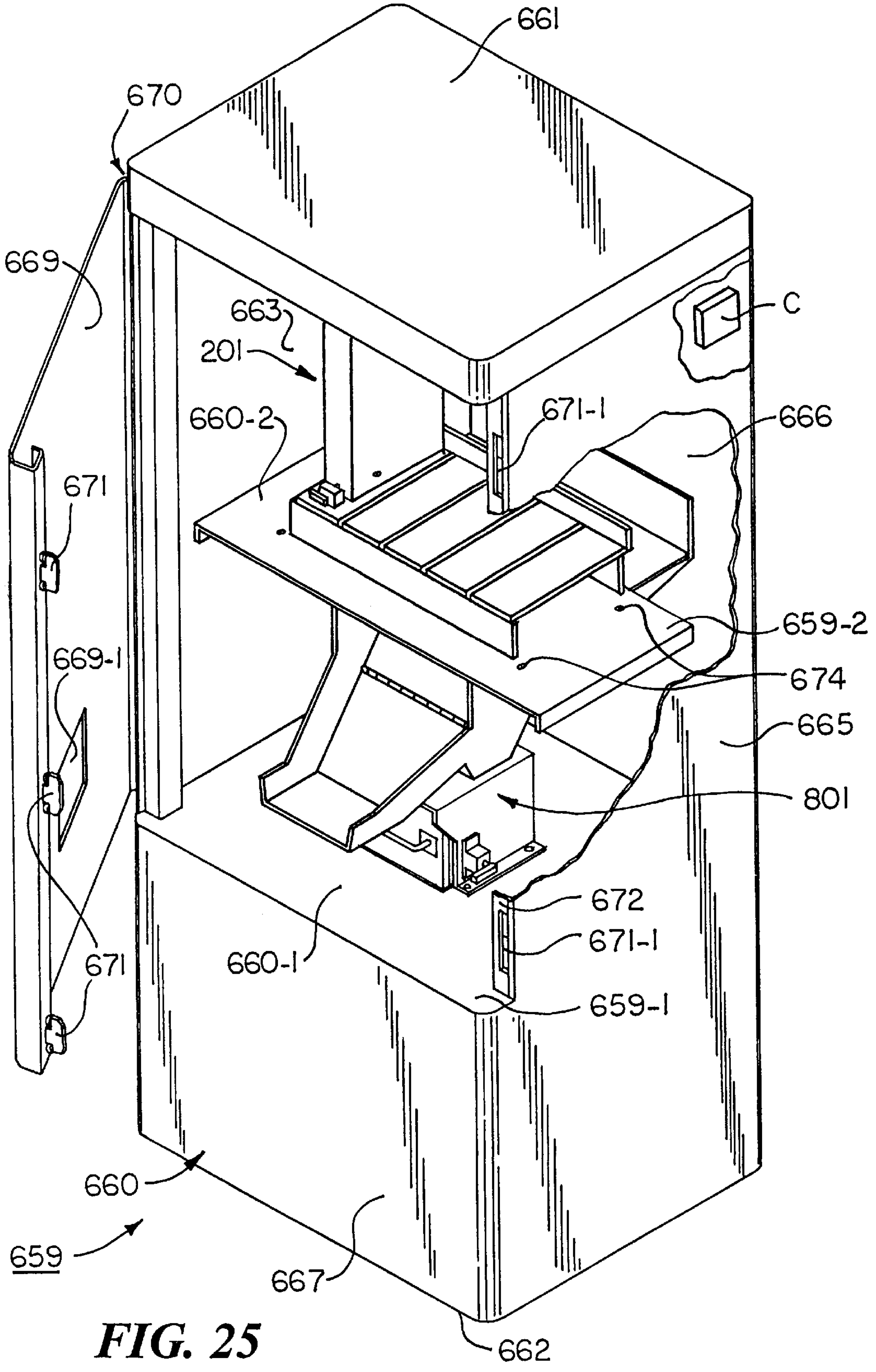
FIG. 25 is a perspective view of the apparatus cabinet shown in FIG. 24, with the door of the cabinet being in the open position.

Referring now to FIGS. 24 through 33 and first to FIGS. 24 and 25, there are shown perspective views of another embodiment of an apparatus according to this invention, the apparatus being identified by reference numeral 659. Apparatus 659 includes a cabinet 660. Cabinet 660 includes a top wall 661, a bottom wall 662, a pair of side walls 663 and 665, a back wall 666, a front wall 667 and a door 669 having an opening 669-1 through which articles are dispensed. Door 669 is attached to side wall 663 by a hinge assembly 670 to provide access to the interior of cabinet 660. The interior of cabinet 660 inlcudes a bottom shelf 660-1 and a top shelf 660-2. In FIG. 24, door 669 is closed while in FIG. 25, door 669 is open. Hinge assembly 670 may be, for example, hinge assembly 80 in U.S. patent application Ser. No. 08/596,967.

Door 669 includes a plurality of latches 671 which engage slots 671-1 in a slidably mounted elongated slotted bracket 672 so as to enable door 669 to lock in its closed position. Bracket 672 is coupled to a lock assembly, the specifics of which are not a part of this invention.

As can be seen in FIG. 25, an article dispensing module 201 is mounted by bolts (not shown) on top of top shelf 660-2.

An angled tray 673 having a hingedly mounted trap door 673-4 is fixedly mounted by bolts 674 on the bottom of shelf 660-2 underneath module 201. Angled tray 673 includes a top portion 673-1, an intermediate portion 673-2, a bottom portion 673-3 and a trap door 6734. Trap door 673-4 is hingedly mounted on intermediate portion 673-2. A reject box assembly 801, which includes a mounting frame 803 and a reject box 805, is disposed on shelf 660-1 underneath angled tray 673. Reject box 805 is slidably mounted within mounting frame 803.

Figure 31:
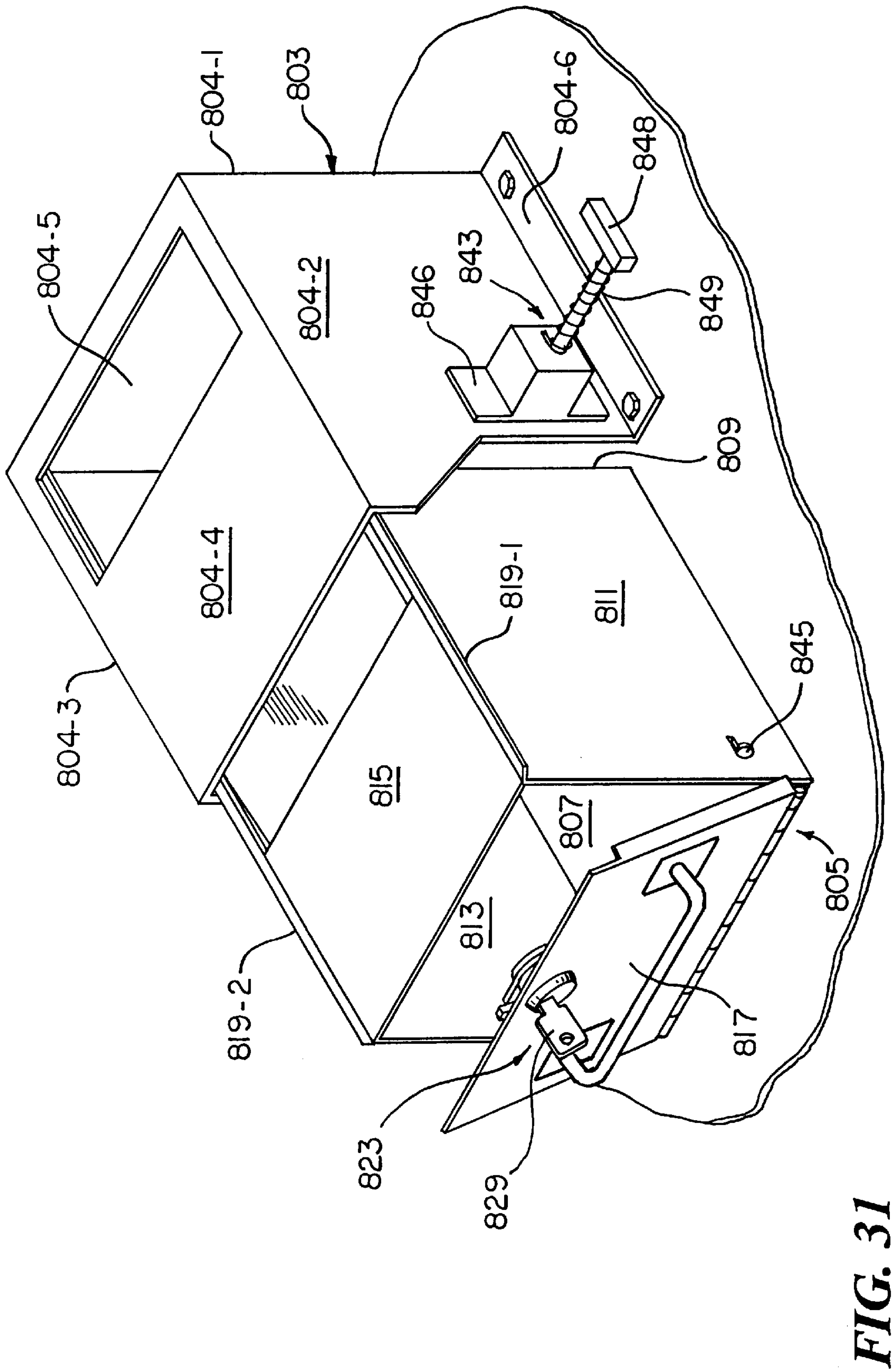
FIG. 31 is a perspective view of the reject box assembly shown in FIG. 25 with the reject box being partially removed from the locking bracket and the article removal door on the reject box in an open position.

As shown in FIG. 31, mounting frame 803 is a generally cube shaped frame which includes a back wall 804-1, a pair of side walls 804-2 and 804-3, and a top wall 804-4 which has a rectangular opening 804-5 formed therein.

Mounting frame 803 additionally includes a mounting leg 804-6 integrally formed and extending outwardly from the bottom of side walls 804-2 and 804-3 which enable mounting frame 803 to be fixedly secured on top of bottom shelf 660-1 of cabinet 660 such as by screws.

Mounting frame 803 further comprises a pair of guide bars (not shown) positioned on the inner surface of sidewalls 804-2 and 804-3 so as to form a narrow slot between the guide bars and top wall 804-4.

Reject box 805 is a generally rectangular shaped box comprising a bottom wall 807, a back wall 809, a pair of side walls 811 and 813, a top wall 815 and a front door 817. Each of sidewalls 811 and 813 includes an outwardly extending flange 819-1 and 819-2, respectively, which enable reject box to be slidably mounted into the narrow slot formed between the guide bars and top wall 804-4 of mounting frame 803. Top wall 815 is sized so as define a rectangularly shaped opening 816 proximate back wall 809 which enables for articles to be dropped into box 805. Front door 817 is hingedly mounted to bottom wall 807 and includes a handle 821 mounted thereon. Front door 817 serves as the access means to the interior of reject box 805.

Reject box 805 also includes a first locking mechanism 823 similar to locking mechanism 269 in FIG. 1 for locking front door 817 in a closed position on reject box 805. First locking mechanism 823 includes a lock 825 fixedly mounted on front door 817, a movable arm 827, a removable key 829 for turning; arm 827 and a bracket 831 on the inside of top wall 815, bracket 831 having an engagement slot 833 for engagement by arm 827. When front door 817 is closed and arm 827 is turned so that it is inside slot 833, front door 817 is locked shut. On the other hand, when arm 827 is not inside slot 833, front door 817 is not in a locked position. Bracket 831 is positioned on the inside of top wall 815 so that arm 827 can extend into slot 833 only when front door 819 is in a fully closed position.

Referring to FIGS. 29–33, apparatus 659 further comprises a second locking mechanism 841 for locking reject box 805 within mounting frame 803. As can be appreciated, second locking mechanism 841 is similar in construction and function to locking mechanism 279 in article dispensing assembly 203. Second locking mechanism 841 includes a key assembly 843, a keyhole 845 formed in reject box 805 and a keyhole (not shown) formed in mounting frame 803. Keyhole 845 extends through side wall 811 of reject box 805. Similarly the keyhole formed in mounting frame 803 extends through side wall 804-2 of mounting frame 803. Keyhole 845 and the keyhole formed in mounting frame 803 are positioned so that when reject box 805 is mounted properly within mounting frame 803, the keyholes are directly in alignment.

Key assembly 843 includes a bracket 846 fixedly mounted onto mounting frame 803 over the keyhole formed in frame 803, a key 847 slidably mounted through bracket 845, a handle 848 for sliding key 847 through bracket 845 and a spring 849 for urging key 847 outward (i.e. away from frame 803 and box 805). When key 847 is inserted into keyhole 845 and the keyholes formed in frame 803, reject box 805 is locked in place within mounting frame 803, as will be described in detail below.

Figure 32:
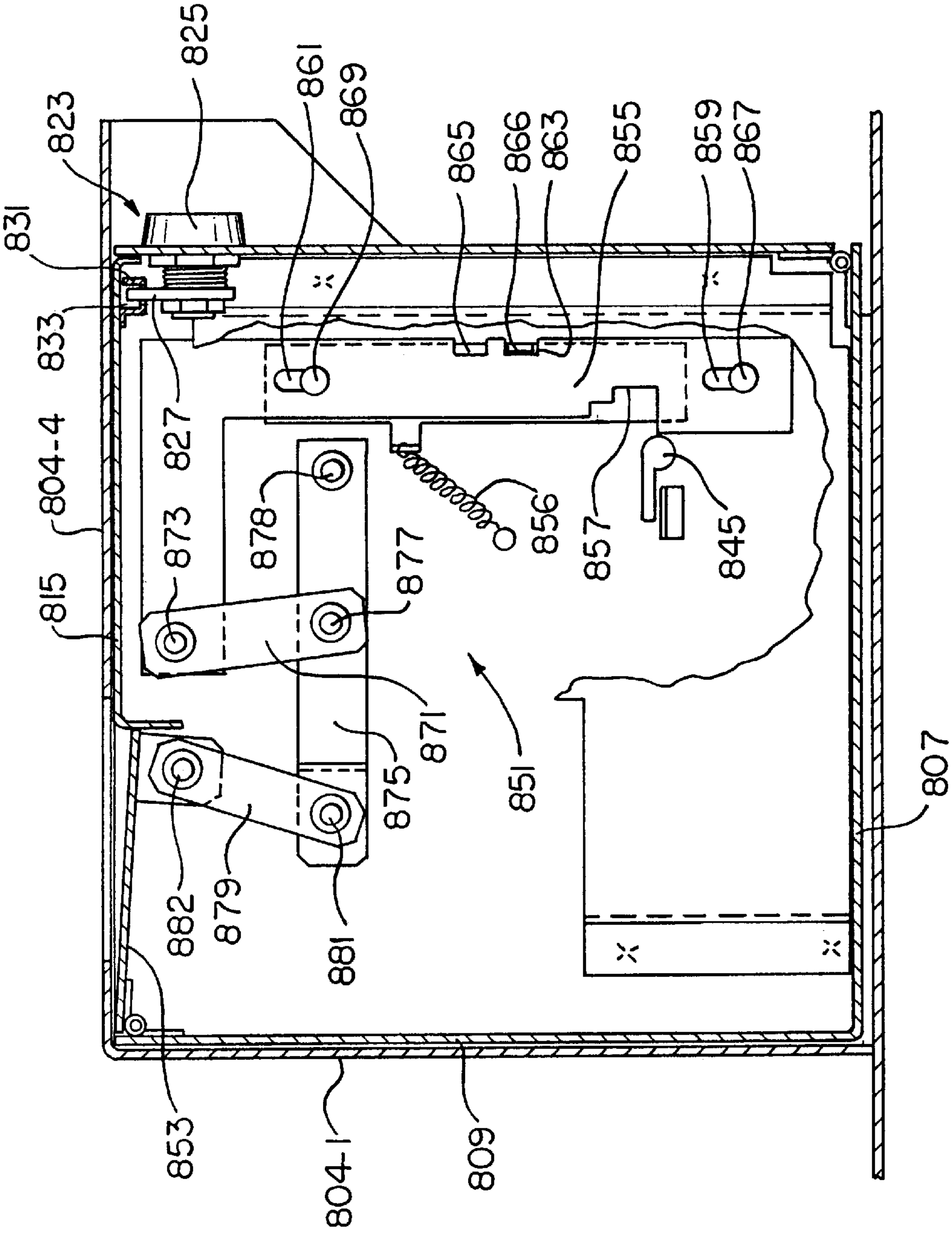
FIG. 32 is a side view of the reject box assembly shown in FIG. 25, partly in section, showing the trap door in the reject box in the closed position.
Figure 33:
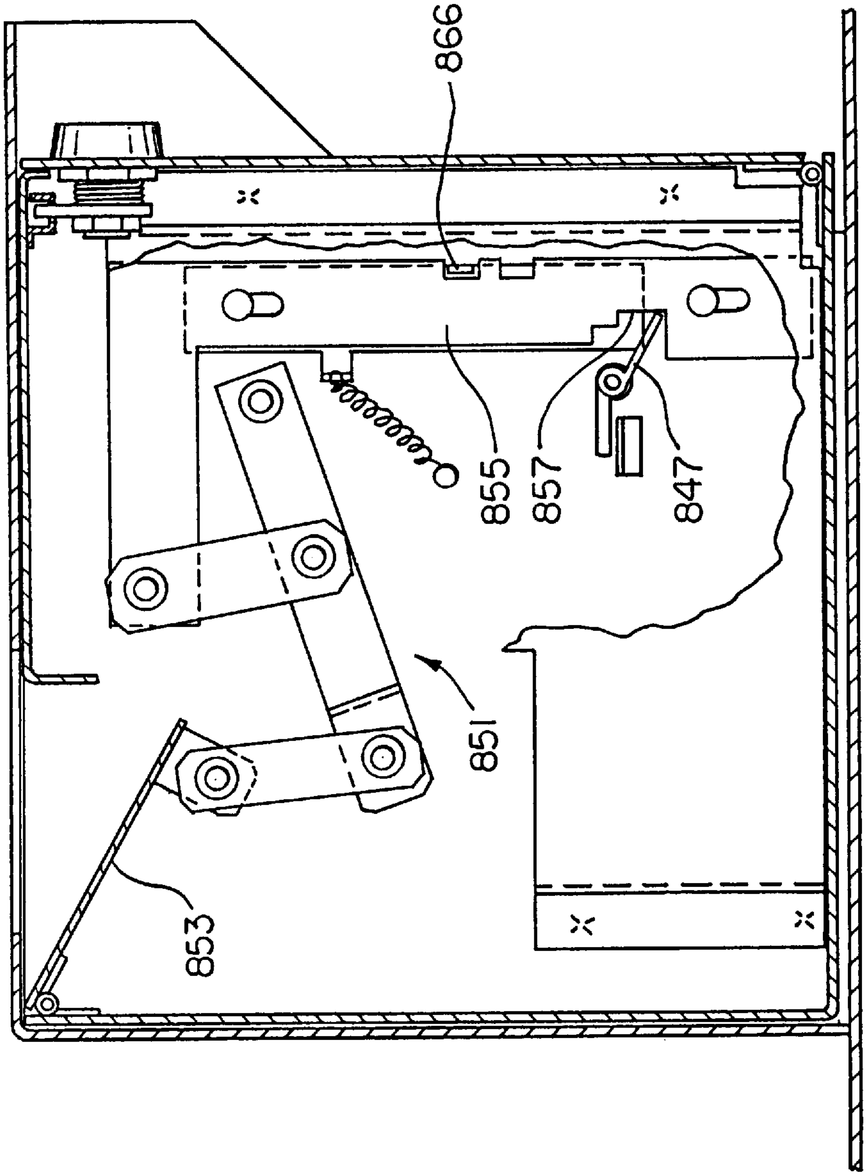
FIG. 33 is a side view of the reject box assembly shown in FIG. 25, partly in section, showing the trap door in the reject box in the open position.

Referring in particular to FIGS. 32 and 33, reject box 805 also includes a lever assembly 851 and a pivotally mounted lid 853. Lever assembly 851 includes a first coupling arm 855 mounted on the inner surface of side wall 811 of reject box 805. First coupling arm 855 is generally L-shaped and includes an engagement slot 857, a pair of riding slots 859 and 861 and a pair of notches 863 and 865. Engagement slot 857 is sized and shaped so as to engage key 847 when key 847 is rotated, as will be described in detail below. First coupling arm 855 is slidably mounted on side wall 811 on pins 867 and 869 which ride in riding slots 859 and 861, respectively, so as to enable arm 855 to move up and down.

First coupling arm 855 is pivotally connected to a second coupling arm 871 by a bolt 873. Second coupling arm 871 is, in turn, is pivotally connected to a third coupling arm 875 by a bolt 877. One end of third coupling arm 875 is mounted onto sidewall 811 by a bolt 878 and the other end of third coupling arm 875 is pivotally connected to a fourth coupling arm 879 by a bolt 881. Fourth coupling arm 879 is, in turn, pivotally connected to pivotally mounted lid 853 by a bolt 882. The movement of lever assembly 851 serves to pivotally open and close lid 853, as will be described in detail below.

Figure 30:
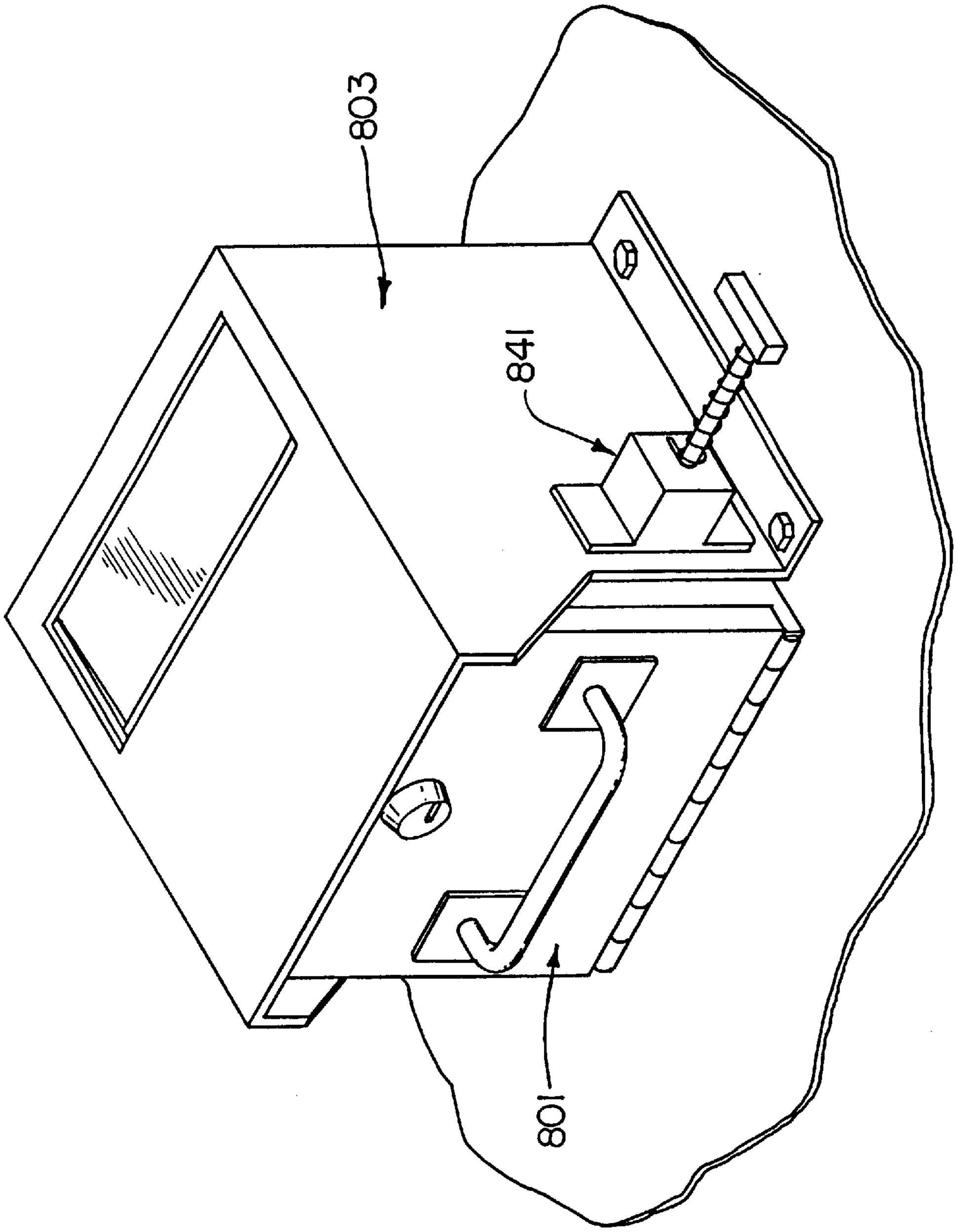
FIG. 30 is a perspective view of the reject box assembly shown in FIG. 25, with the reject box unlocked on the mounting frame and with the trap door in the reject box being shown in the closed position.

In use, reject box 805 functions within apparatus 659 in the following manner. With second locking mechanism 841 in its unlocked position, reject box 805 is unlocked and is in its state for transport away from mounting frame 803. With reject box 805 unlocked from mounting frame 803, first coupling arm 855 of reject box 805 is locked in its upper position, as shown in FIGS. 30–32. In its upper position, coupling arm 855 pivots coupling arms 871, 875 and 879 such that lid 853 entirely covers rectangular opening 816 of box 805 and thereby prevents articles either from being inserted into or withdrawn from reject box 805 through opening 816.

Figure 29:
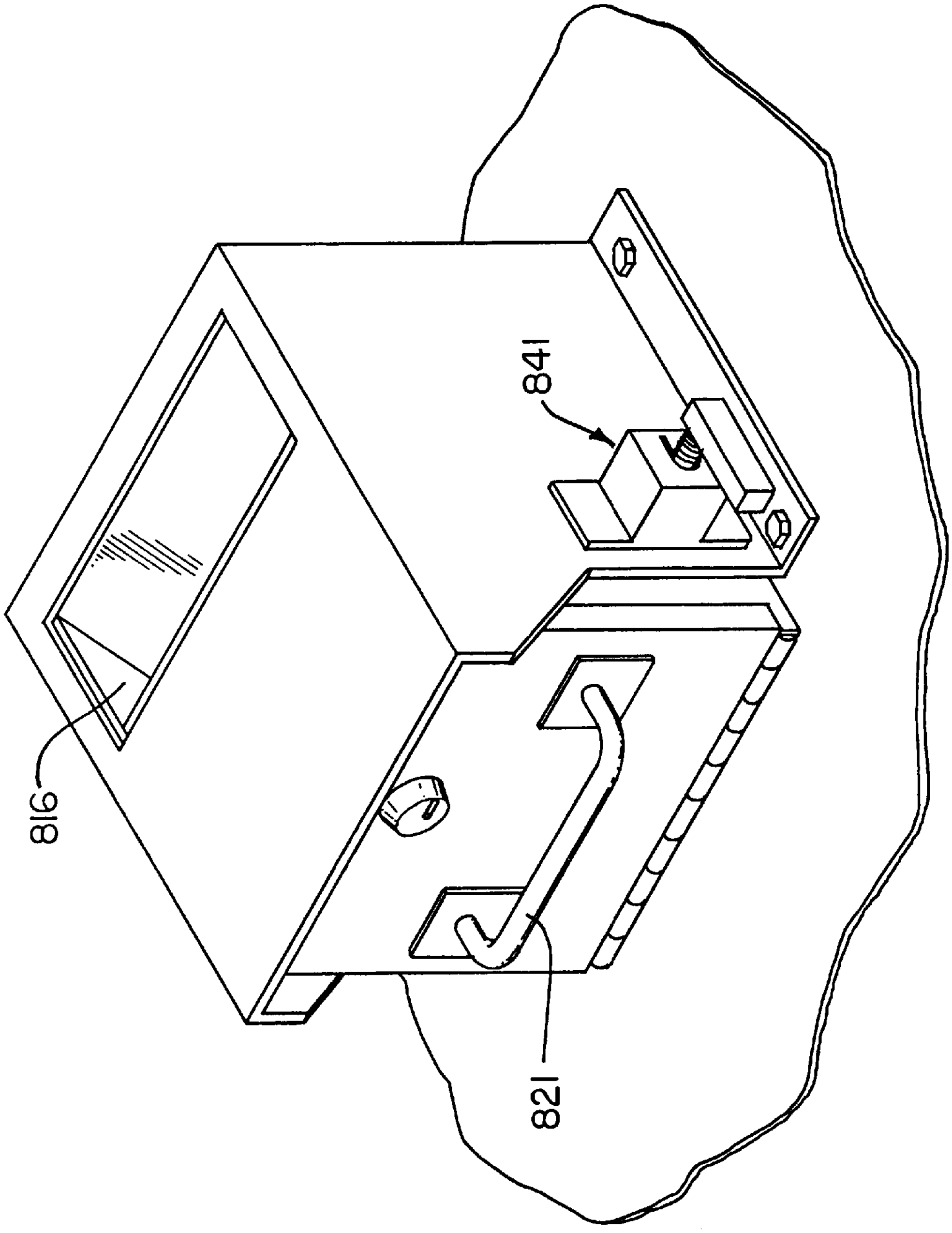
FIG. 29 is a perspective view of the reject box assembly shown in FIG. 25, with the reject box locked onto the mounting frame, the trap door in the reject box being shown in the open position.

Reject box 805 can be slidably mounted within mounting frame 803 such that flanges 819-1 and 819-2 are inserted into the slots formed within mounting frame 803. With reject box 805 positioned within mounting frame 803 as such, key 847 can be inserted through both the keyhole in mounting frame 803 and keyhole 845 in reject box 805. While still inserted through the keyholes, key 847 can be rotated counterclockwise. Counterclockwise rotation of key 847 will, in addition to locking reject box 805 in place within mounting frame 803, cause key 847 to engage engagement slot 857 so as to urge first coupling arm 855 from its upper position and down into its lower position, as shown in FIGS. 29 and 33.

As first coupling arm 855 is moved to its lower position, coupling arms 871, 875 and 879 pivot so as to pivot down lid 853 away from opening 816. With lid 853 pivoted in a down position, articles can be readily passed through opening 816 and into the interior of reject box 805.

Thus, key 847 performs two functions when inserted and turned; namely, it locks reject box 805 in place within frame 803 and at the same time, pivots lid 853 of reject box 805 down and into an open position.

Notches 863 and 865 in first coupling arm 853 engage a tab 866 which projects in from sidewall 811 of reject box 805 so as to lock arm 855 in either its upper or lower position. Specifically, tab 866 engages notch 863 to lock arm 855 in its upper position, as shown in FIG. 32, and tab 866 engages notch 865 to lock arm 855 in its lower position, as shown in FIG. 33. In addition, a spring 856 is connected to arm 855 from sidewall 811 to urge arm 855 in either of the two positions.

Figure 26:
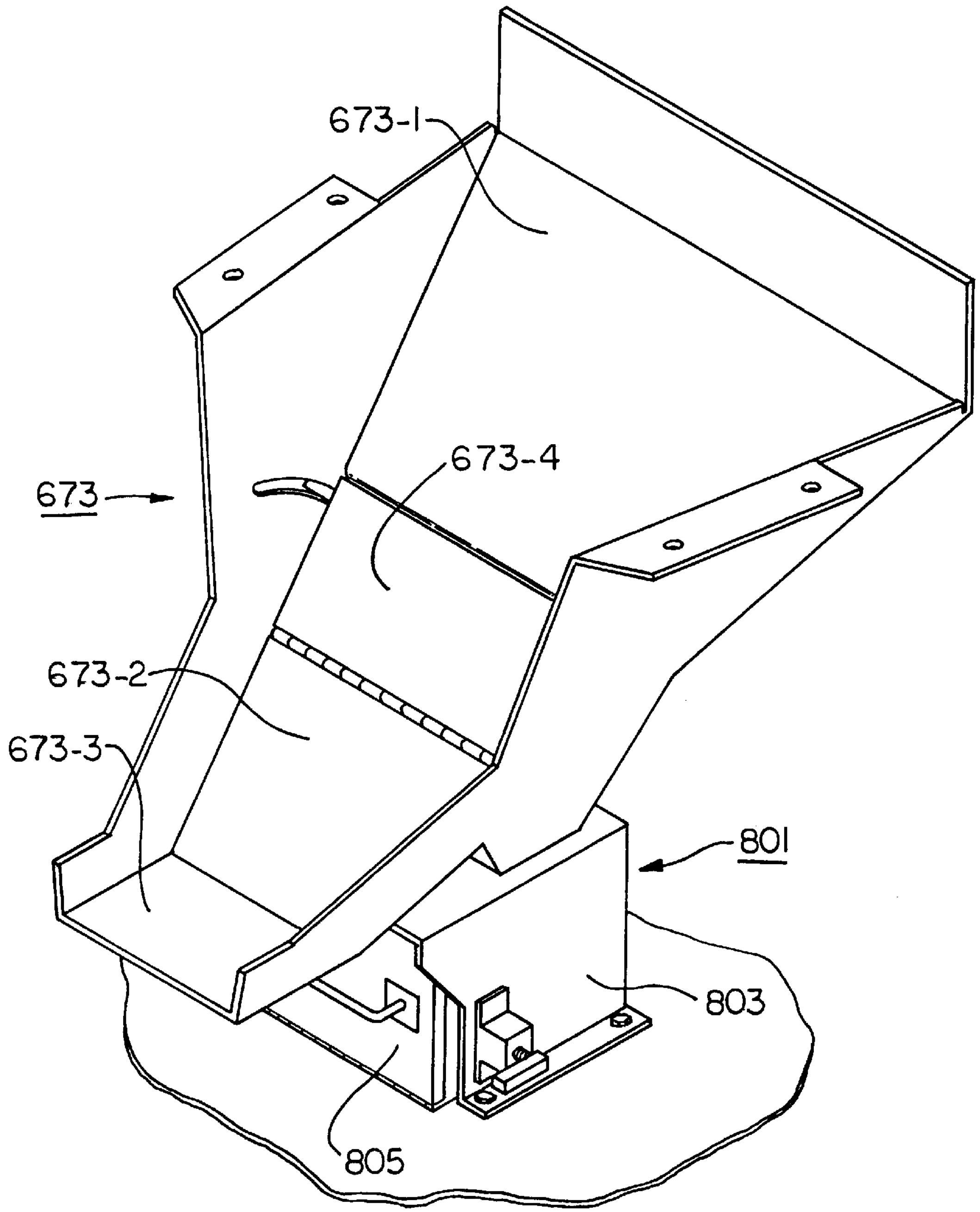
FIG. 26 is a perspective view of the angled tray, reject box and locking bracket shown in FIG. 25, with the trap door in the angled tray being in the closed postition.
Figure 27:
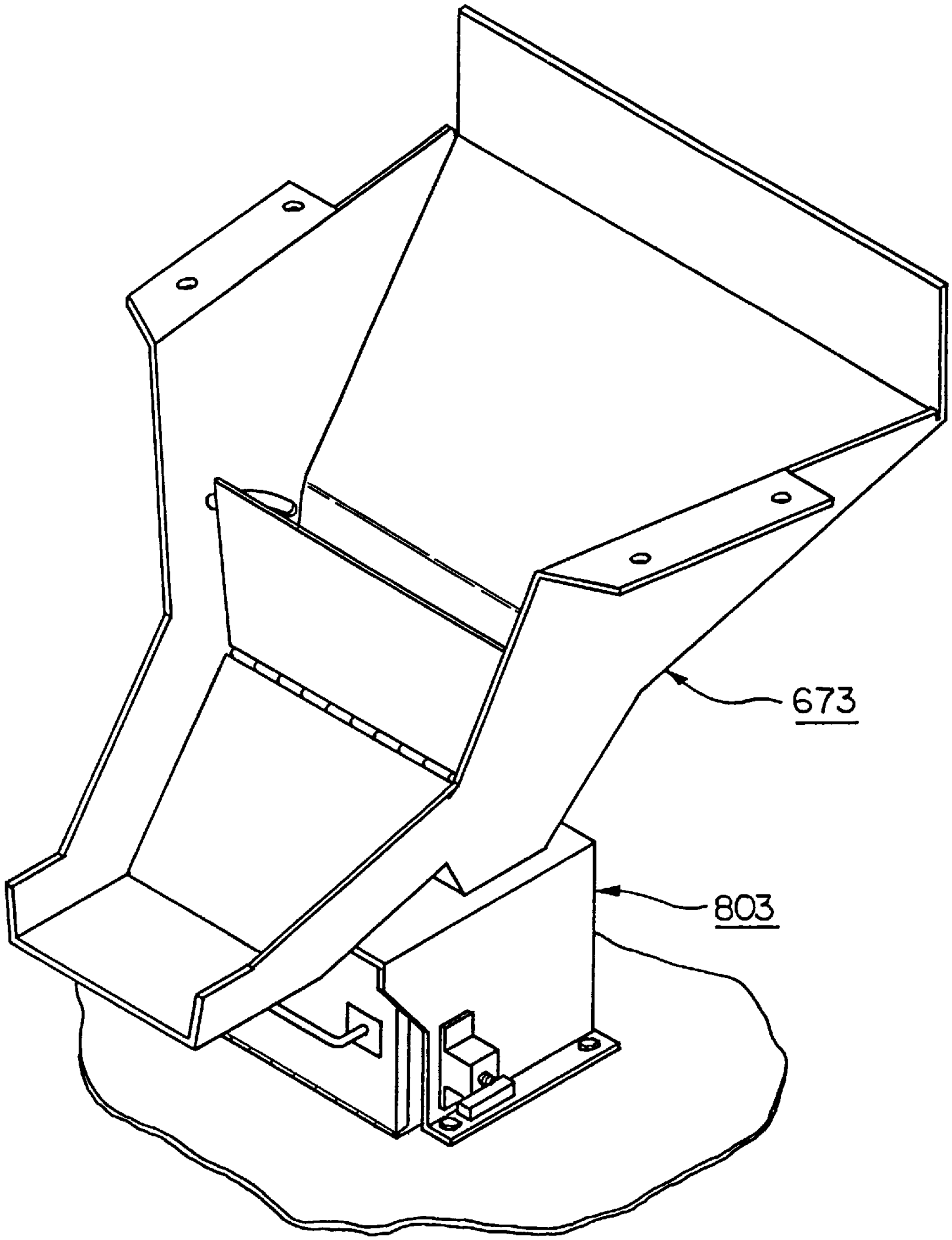
FIG. 27 is a perspective view of the angled tray, reject box and locking bracket shown in FIG. 25, with the trap door in the angled tray being in the open position.
Figure 28:
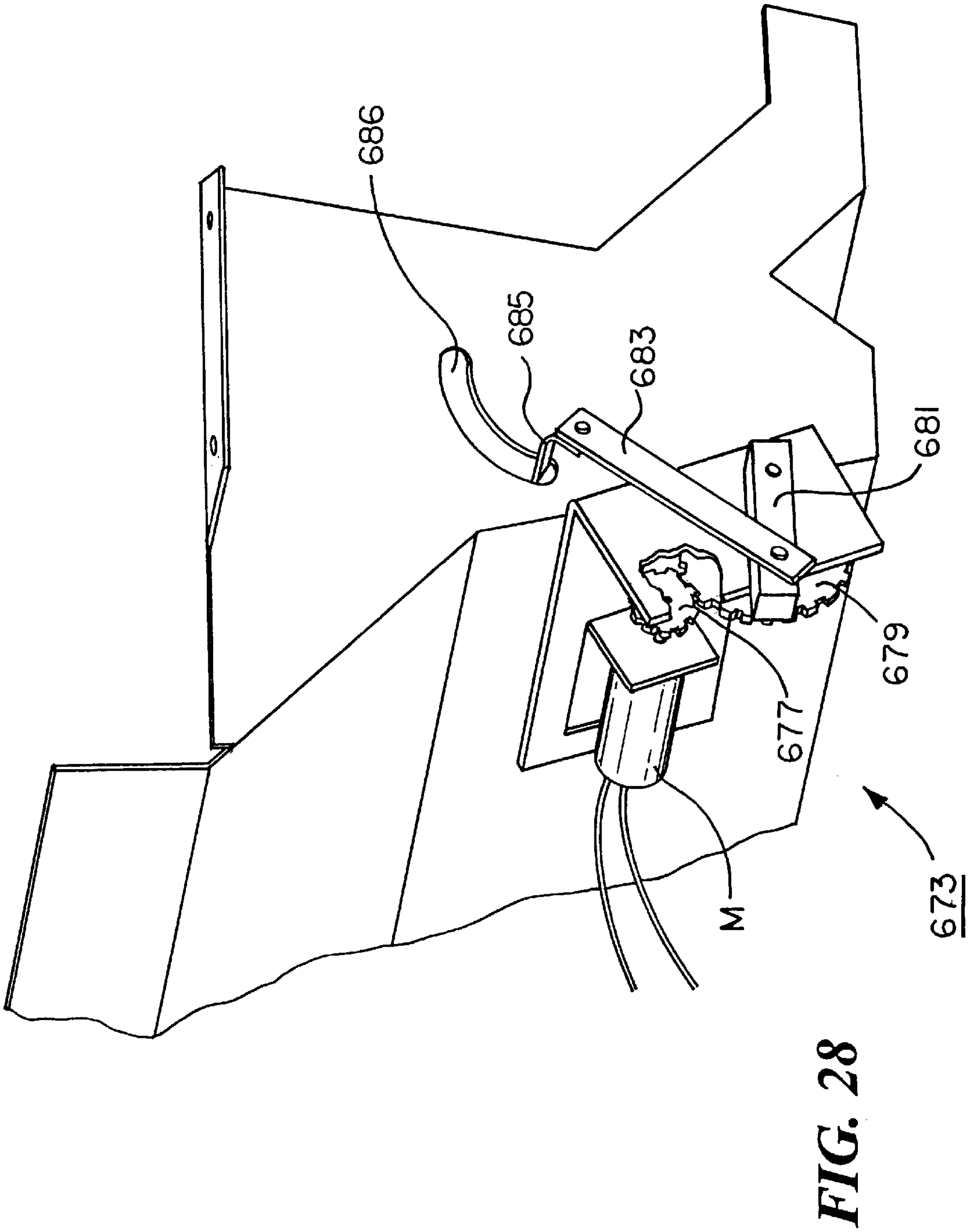
FIG. 28 is a fragmentary rear perspective view of the angled tray shown in FIG. 25.

Referring now to FIGS. 26–27, angled tray 673 functions in relation to apparatus 659 in the following manner. As articles are dispensed from module 201, the articles slide down tray 673 to the bottom where they can be removed by a person through opening 669-1 of cabinet 660. However, upon the detection of a defective article, computer C activates a motor M which is mounted onto tray 673, as shown in FIG. 27.

Motor M is coupled to a first gear 677 which is, in turn, coupled to a second gear 679. Second gear 679 is coupled to first linkage 681 which is, in turn, coupled to a second linkage 683 which is, in turn, coupled to a third linkage 685. Third linkage 685 passes through an arcuate slot 686 in tray 673 and is coupled to trap door 673-4. Activation of motor M rotates gears 677 and 679 which, in turn, moves linkages 681, 683 and 685 which, in turn, opens trap door 673-4. With trap door 673-4 open, the defective articles will slide down tray 673, through trap door 673-4, through opening 816 and into reject box 805, where the defective articles will remain. The articles will remain within reject box 805 and can not be accessed without possession of key 829 of first locking mechanism 823. Trap door 673-1 remains open until computer C determines that the articles are no longer defective. At that point, computer C will activate motor M to close trap door 673-4.

The embodiments shown of the present invention are intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. Apparatus for dispensing articles such as tickets, cards and the like comprising:

a. a cabinet having a front and a back, b. an article dispensing module inside said cabinet, c. a computer inside said cabinet, d. an angled tray inside said cabinet for receiving articles dispensed by said article dispensing module, said angled tray comprising a pivotally mounted trap door for directing articles dispensed by said article dispensing module, and e. a reject box inside said cabinet for collecting articles received by said angled tray which are deemed defective.

2. Apparatus for dispensing articles such as tickets, cards and the like comprising:

a. a cabinet having a front and a back, b. an article dispensing module inside said cabinet, and c. a reject box removably mounted inside said cabinet, said reject box collecting articles received from the article dispensing module which are deemed defective, said reject box comprising a bottom wall, a back wall, a pair of sidewalls, a front door, a top wall having an opening and a lid pivotally disposed over the opening in the top wall.

3. Apparatus for dispensing articles such as tickets, cards and the like comprising:

a. a cabinet, b. an article dispensing module disposed within said cabinet, c. an angled tray disposed within said cabinet beneath said article dispensing module for receiving articles dispensed by said article dispensing module, and d. a reject box assembly disposed within said cabinet beneath said angled tray for collecting articles received by said angled tray which are deemed defective, said reject box assembly including a mounting frame and a reject box slidably disposed within the mounting frame, said reject box comprising a bottom wall, a back wall, a pair of sidewalls, a front door, a top wall having an opening and a lid pivotally disposed over the opening in the top wall.

4. Apparatus for dispensing articles such as tickets, cards and the like comprising:

a. a cabinet having a front and a back, b. an article dispensing module inside said cabinet, said article dispensing module including at least one article dispensing assembly and a support plate, each article dispensing assembly comprising:

i. a base, ii. a removable frame on the base for enclosing a plurality of articles to be dispensed in a stack, the frame including an open top through which articles are loaded, a cover for covering the top, a rear wall underneath through which articles exit the frame and a first locking mechanism for locking the cover in place over the open top, iii. a second locking mechanism for locking the frame in place on the base, iv. a gate for receiving articles from said frame and allowing only one article at a time to pass through, v. a transport mechanism for transporting articles from said frame to said gate, c. an angled tray inside the cabinet, said angled tray comprising a pivotally mounted trap door for directing articles dispensed by said article dispensing module, and d. a reject box inside said cabinet.

5. Apparatus for dispensing articles such as tickets, cards and the like comprising:

a. a cabinet having a front and a back, b. an article dispensing module inside said cabinet, c. a computer inside said cabinet, d. an angled tray inside said cabinet for receiving articles dispensed by said article dispensing module, and e. a reject box inside said cabinet for collecting articles received by said angled tray which are deemed defective, said reject box including an opening through which articles can enter the reject box, a lid for closing said opening, a cover for removing articles inside the reject box and a first locking mechanism for locking said cover in a closed position.

6. The apparatus of claim 5 wherein said cabinet includes a first shelf and a said apparatus further includes a mounting frame fixedly mounted on said first shelf and a second locking mechanism for locking said reject box onto said mounting frame.

7. The apparatus of claim 6 wherein said reject box is removably disposed underneath said angled tray and said angled tray includes a trap door for selectively routing articles on said angled tray into said reject box.

8. Apparatus for dispensing articles such as tickets, cards and the like comprising:

a. a cabinet, b. an article dispensing module disposed within said cabinet, c. an angled tray disposed within said cabinet beneath said article dispensing module for receiving articles dispensed by said article dispensing module, and d. a reject box assembly disposed within said cabinet beneath said angled tray, said reject box assembly including a mounting frame and a reject box slidably disposed within the mounting frame, said reject box comprising a bottom wall, a back wall, a pair of sidewalls, a front door, a top wall having a an opening and a lid pivotally disposed over the opening in the top wall.

9. The apparatus of claim 8 wherein said reject box comprises a lever assembly coupled to the lid for pivotally displacing the lid between an open position and a closed position over the opening in the top wall.

10. The apparatus of claim 9 wherein the front door of said reject box is hingedly mounted onto the bottom wall of said reject box.

11. The apparatus of claim 10 wherein said reject box comprises a first locking mechanism for locking the front door of said reject box in a closed position.

12. The apparatus of claim 11 wherein said reject box assembly comprises a second locking mechanism for locking said reject box within said mounting frame.

13. The apparatus of claim 12 wherein said angled tray comprises a pivotally mounted trap door and a motor for displacing the trap door between an open position and a closed position.

14. The apparatus of claim 13 further comprising a computer disposed within said cabinet for activating the motor for displacing the trap door.

* * * * *